(12) United States Patent
Ikeda

(10) Patent No.: US 10,046,615 B2
(45) Date of Patent: Aug. 14, 2018

(54) VEHICLE HEIGHT ADJUSTMENT DEVICE

(71) Applicant: Showa Corporation, Gyoda-shi (JP)

(72) Inventor: Masayoshi Ikeda, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/405,521

(22) Filed: Jan. 13, 2017

(65) Prior Publication Data
US 2017/0267047 A1    Sep. 21, 2017

(30) Foreign Application Priority Data
Mar. 17, 2016    (JP) .................................. 2016-054511

(51) Int. Cl.
| | | |
|---|---|---|
| *B60G 17/0185* | (2006.01) | |
| *B60G 23/00* | (2006.01) | |
| *B62C 3/00* | (2006.01) | |
| *B62K 25/00* | (2006.01) | |
| *G06F 7/00* | (2006.01) | |

(Continued)

(52) U.S. Cl.
CPC ....... *B60G 17/0185* (2013.01); *B60G 17/016* (2013.01); *B60G 17/019* (2013.01); *B60G 17/0161* (2013.01); *B62K 25/04* (2013.01); *B62K 25/08* (2013.01); *B60G 2202/42* (2013.01); *B60G 2204/62* (2013.01); *B60G 2300/12* (2013.01); *B60G 2400/204* (2013.01); *B60G 2400/208* (2013.01); *B60G 2400/252* (2013.01); *B60G 2500/30* (2013.01); *B60G 2500/324* (2013.01); *B60G 2600/02* (2013.01); *B60G 2600/07* (2013.01); *B60G 2600/08* (2013.01); *B60G 2800/80* (2013.01); *B60G 2800/914* (2013.01); *B62K 2025/044* (2013.01); *B62K 2025/045* (2013.01)

(58) Field of Classification Search
CPC ........................ B60G 17/0185; B60G 17/016; B60G 17/019; B60G 17/02; B60G 17/04; B60G 11/26; B62K 25/04
USPC .......................... 701/39; 280/5.515; 364/424
See application file for complete search history.

(56) References Cited

U.S. PATENT DOCUMENTS

| | | | |
|---|---|---|---|
| 5,041,977 A * | 8/1991 | Kawabata | .......... B60G 17/0185 280/5.501 |
| 2005/0052150 A1 | 3/2005 | Bender | |

(Continued)

FOREIGN PATENT DOCUMENTS

| | | |
|---|---|---|
| EP | 3072714 A | 3/2005 |
| JP | 08-022680 A | 1/1996 |

OTHER PUBLICATIONS

Extended European Search Report dated Aug. 24, 2017 for the corresponding European Patent Application No. 17152959.7.

*Primary Examiner* — Mahmoud S Ismail
(74) *Attorney, Agent, or Firm* — Leason Ellis LLP

(57) ABSTRACT

A vehicle height adjustment device includes a changer, a vehicle height controller, and a malfunction detector. The changer is drivable when supplied with a current and configured to change a relative position of a body of a vehicle relative to an axle of a wheel of the vehicle. The vehicle height controller is configured to perform such control that a target current set based on the relative position is supplied to the changer so as to control a vehicle height, which is a height of the body of the vehicle. The malfunction detector is configured to detect a failure to make the target current flow to the changer.

4 Claims, 17 Drawing Sheets

(51) Int. Cl.
*G06F 17/00* (2006.01)
*G06F 19/00* (2018.01)
*B60G 17/016* (2006.01)
*B60G 17/019* (2006.01)
*B62K 25/04* (2006.01)
*B62K 25/08* (2006.01)

(56) References Cited

U.S. PATENT DOCUMENTS

| | | | |
|---|---|---|---|
| 2006/0181034 A1* | 8/2006 | Wilde | B60G 15/12 |
| | | | 280/5.515 |
| 2009/0266152 A1 | 10/2009 | Hein | |
| 2014/0163820 A1 | 6/2014 | Nettelmann et al. | |

* cited by examiner

VEHICLE HEIGHT ADJUSTMENT DEVICE

CROSS-REFERENCE TO RELATED APPLICATIONS

The present application claims priority under 35 U.S.C. § 119 to Japanese Patent Application No. 2016-054511, filed Mar. 17, 2016. The contents of this application are incorporated herein by reference in their entirety.

BACKGROUND

Field

The present disclosure relates to a vehicle height adjustment device.

Related Art

Japanese Examined Patent Publication No. H08-22680 discloses a vehicle height adjustment device that increases the height of a motorcycle during travel and that decreases the height of the motorcycle during halt in order to facilitate a rider's or a passenger's getting on and off the motorcycle.

The vehicle height adjustment device automatically changes the height of the motorcycle in response to its speed of travel. Specifically, the vehicle height adjustment device automatically increases the height of the motorcycle when its speed reaches a set speed, and automatically decreases the height of the motorcycle when its speed changes to or below a set speed. In the adjustment of the height of the motorcycle, an electromagnetic actuator is driven into operation.

SUMMARY

According to one aspect of the present disclosure, a vehicle height adjustment device includes a changer, a vehicle height controller, and a malfunction detector. The changer is drivable when supplied with a current and configured to change a relative position of a body of a vehicle relative to an axle of a wheel of the vehicle. The vehicle height controller is configured to perform such control that a target current set based on the relative position is supplied to the changer so as to control a vehicle height, which is a height of the body of the vehicle. The malfunction detector is configured to detect a failure to make the target current flow to the changer.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
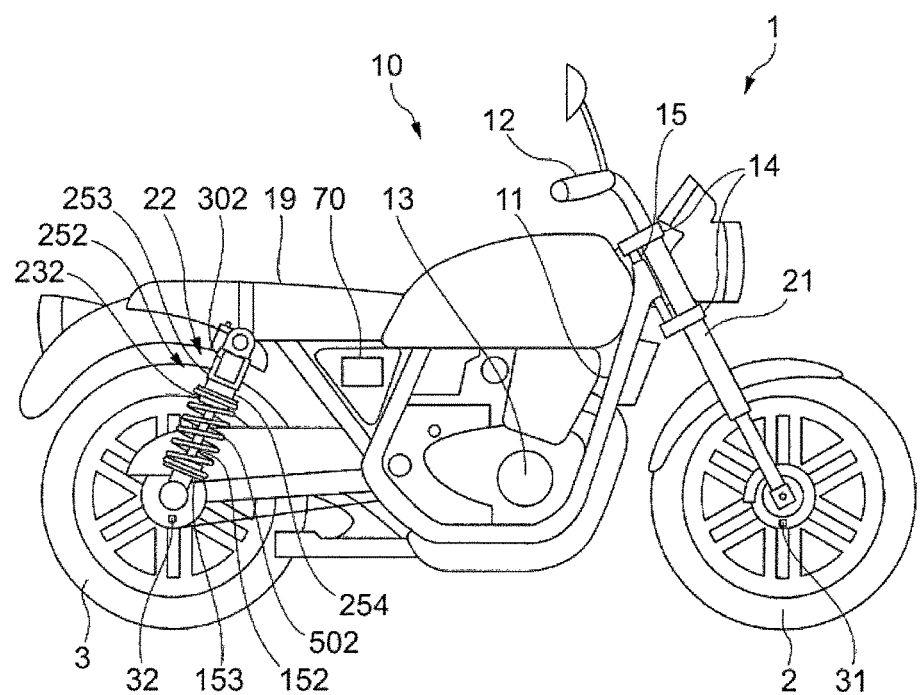
FIG. 1 illustrates a schematic configuration of a motorcycle according to an embodiment.

The embodiments will now be described with reference to the accompanying drawings, wherein like reference numerals designate corresponding or identical elements throughout the various drawings.

FIG. 1 illustrates a schematic configuration of a motorcycle 1 according to this embodiment.

The motorcycle 1 includes a front wheel 2, a rear wheel 3, and a body 10. The front wheel 2 is a wheel on the front side of the motorcycle 1. The rear wheel 3 is a wheel on the rear side of the motorcycle 1. The body 10 includes elements such as a frame 11, a handle 12, an engine 13, and a seat 19. The frame 11 defines the framework of the motorcycle 1.

The motorcycle 1 includes two front forks 21. One of the front forks 21 is on the right side of the front wheel 2, and the other one of the front forks 21 is on the left side of the front wheel 2. The front forks 21 are examples of a suspension device that couples the front wheel 2 and the body 10 to each other. The motorcycle 1 includes two rear suspensions 22. One of the rear suspensions 22 is on the right side of the rear wheel 3, and the other one of the rear suspensions 22 is on the left side of the rear wheel 3. The rear suspensions 22 couple the rear wheel 3 and the body 10 to each other. FIG. 1 illustrates only the front fork 21 and the rear suspension 22 that are on the right side of the motorcycle 1. The front fork 21 and the rear suspension 22 are an example of the changer to change a relative position of the body 10 relative to the axle of the front wheel 2 and a relative position of the body 10 relative to the axle of the rear wheel 3.

The motorcycle 1 includes two brackets 14 and a shaft 15. The shaft 15 is disposed between the two brackets 14. The two brackets 14 respectively hold the front fork 21 on the right side of the front wheel 2 and the front fork 21 on the left side of the front wheel 2. The shaft 15 is rotatably supported by the frame 11.

The motorcycle 1 includes a controller 70. The controller 70 controls the height of the motorcycle 1 by controlling a front-wheel passage switch unit 300, described later, of each front fork 21 and a rear-wheel passage switch unit 302, described later, of each rear suspension 22.

The motorcycle 1 also includes a front-wheel rotation detection sensor 31 and a rear-wheel rotation detection sensor 32. The front-wheel rotation detection sensor 31 detects the rotation angle of the front wheel 2. The rear-wheel rotation detection sensor 32 detects the rotation angle of the rear wheel 3.

Configuration of Front Fork 21

Each front fork 21 will be described in detail below.

Figure 2:
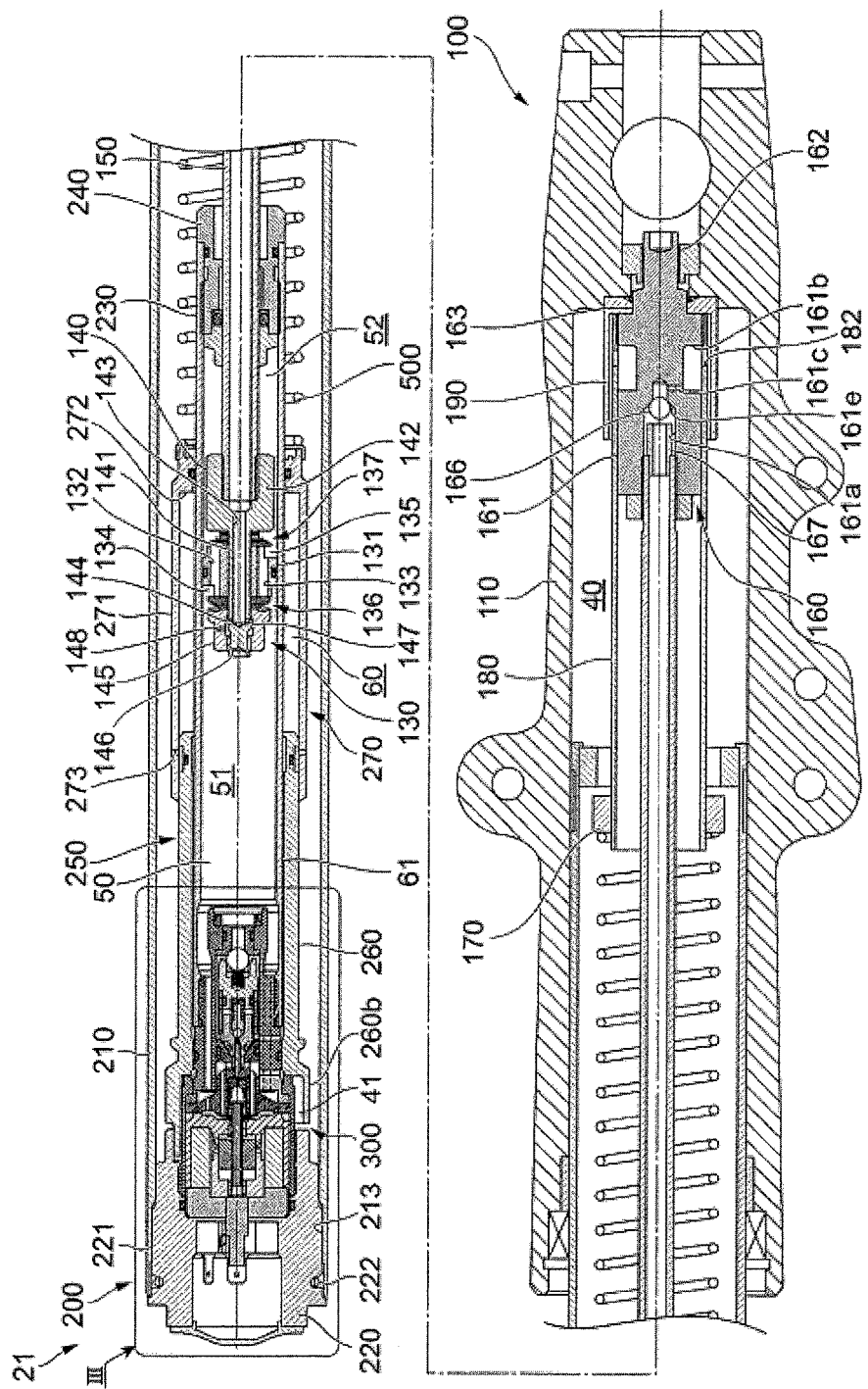
FIG. 2 is a cross-sectional view of a front fork according to the embodiment.

FIG. 2 is a cross-sectional view of the front fork 21 according to this embodiment.

The front fork 21 according to this embodiment is what is called an upright front fork that is disposed between the body 10 and the front wheel 2 of the motorcycle 1 so as to support the front wheel 2. The upright front fork 21 includes an outer member 110 (detailed later) and an inner tube 210 (detailed later). The outer member 110 is disposed on the side of the front wheel 2, and the inner tube 210 is disposed on the side of the body 10.

The front fork 21 includes an axle side unit 100 and a body side unit 200. The axle side unit 100 includes the outer member 110 and is mounted on the axle of the front wheel 2. The body side unit 200 includes the inner tube 210 and is mounted on the body 10. The front fork 21 also includes a front-wheel spring 500. The front-wheel spring 500 is disposed between the axle side unit 100 and the body side unit 200 to absorb vibrations transmitted to the front wheel 2 caused by the roughness of a ground surface.

The outer member 110 and the inner tube 210 are coaxial, hollow cylindrical members. A direction of the center line (that is, an axial direction) of each cylinder will be hereinafter occasionally referred to as "vertical direction". In this case, the body 10 side will occasionally be referred to as the upper side, and the front wheel 2 side will occasionally be referred to as the lower side. By moving the axle side unit 100 and the body side unit 200 relative to each other in the vertical direction (axial direction), the front fork 21 absorbs vibrations caused by the roughness of the ground surface while supporting the front wheel 2.

Configuration of Axle Side Unit 100

The axle side unit 100 includes the outer member 110, an attenuation force generation unit 130, a rod 150, and a rod holding member 160. The outer member 110 is mounted on the axle of the front wheel 2. The attenuation force generation unit 130 generates attenuation force utilizing viscous resistance of oil. The rod 150 holds the attenuation force generation unit 130. The rod holding member 160 holds the lower-side end of the rod 150.

Configuration of Attenuation Force Generation Unit 130

The attenuation force generation unit 130 includes a piston 131, an upper-end side valve 136, and a lower-end side valve 137. The piston 131 defines an operating oil chamber 50, which is formed in the space inside a cylinder 230, described later. The upper-end side valve 136 is disposed at the upper-side end of the piston 131. The lower-end side valve 137 is disposed at the lower-side end of the piston 131. The attenuation force generation unit 130 also includes a piston bolt 140 and a nut 145. The piston bolt 140 supports the piston 131, the upper-end side valve 136, the lower-end side valve 137, and other members. The nut 145 is screwed on the piston bolt 140 to determine the positions of the piston 131, the upper-end side valve 136, the lower-end side valve 137, and other members.

The piston 131 is a hollow cylindrical member and has on its outer surface a hermetic member sealing the gap between the cylinder 230 and the piston 131. The piston 131 also has a first through hole 132 and a second through hole 133, which are through holes open in the axial direction. The piston 131 includes first radial conduits 134 and second radial conduits 135. The first radial conduits 134 radially extend at the upper-side end of the piston 131 and communicate with the first through hole 132. The second radial conduits 135 radially extend at the lower-side end of the piston 131 and communicate with the second through hole 133. A non-limiting example of the number of each of the first through holes 132 and the second through holes 133 is three. The three first through holes 132 and the three second through holes 133 are each disposed at equal intervals in a circumferential direction and at positions respectively corresponding to the first through hole 132 and the second through hole 133.

The piston bolt 140 includes the shaft 141 and a base 142. The shaft 141 is disposed on an upper end side of the piston bolt 140 and has a solid cylindrical shape. The base 142 is disposed on a lower end side of the piston bolt 140 and has a solid cylindrical shape of larger radius than a radius of the shaft 141. In the piston bolt 140, a depression 143 is formed over a depth from the lower-side end surface of the base 142 to the shaft 141. At the upper-side end of the depression 143, a radial through hole 144 is formed. The radial through hole 144 radially penetrates the depression 143 to allow the depression 143 to communicate with an outside of the shaft 141.

On the upper-side end of the nut 145, a female thread 146 is formed. The female thread 146 receives a male thread of the piston bolt 140. Under the female thread 146, a depression 147 is formed. The depression 147 is depressed over a depth from the lower-side end surface of the nut 145, and has a solid cylindrical shape of larger radius than the radius of the root of the female thread 146. In the nut 145, a radial through hole 148 is formed. The radial through hole 148 radially penetrates the nut 145 to allow the outside of the nut 145 to communicate with the depression 147.

With the configuration described hereinbefore, the attenuation force generation unit 130 is held on the rod 150 with the male thread on the upper-side end of the rod 150 screwed on the female thread on the depression 143 of the piston bolt 140. The piston 131 is in contact with the inner surface of the cylinder 230 through the hermetic member on the outer surface of the piston 131. Thus, the piston 131 defines a first oil chamber 51 and a second oil chamber 52 in the space inside the cylinder 230. The first oil chamber 51 is upper than the piston 131, and the second oil chamber 52 is lower than the piston 131.0020, 0021

Configuration of Rod Holding Member 160

The rod holding member 160 has a plurality of solid cylindrical portions of different diameters. Namely, the rod holding member 160 includes the upper-end-side solid cylindrical portion 161, a lower-end-side solid cylindrical portion 162, and an intermediate solid cylindrical portion 163. The upper-end-side solid cylindrical portion 161 is disposed at the upper-side end of the rod holding member 160. The lower-end-side solid cylindrical portion 162 is disposed at the lower-side end of the rod holding member 160. The intermediate solid cylindrical portion 163 is disposed between the upper-end-side solid cylindrical portion 161 and the lower-end-side solid cylindrical portion 162.

The upper-end-side solid cylindrical portion 161 has the axial depression 161a, a radial depression 161b, and a radial through hole 161c. The axial depression 161a is depressed over a depth in the axial direction from an upper-side end surface of the upper-end-side solid cylindrical portion 161. The radial depression 161b is depressed radially throughout a circumference of the upper-end-side solid cylindrical portion 161 over a depth from an outer surface of the upper-end-side solid cylindrical portion 161. The radial through hole 161c penetrates the axial depression 161a and the radial depression 161b in a radial direction.

The axial depression 161a also has an inclined surface 161e. The inclined surface 161e is inclined relative to the axial direction, that is, an inner diameter of the inclined surface 161e gradually decreases in a lower side direction.

Configuration of Support-Member Holding Member 180

The support-member holding member 180 is a hollow cylindrical member. The support-member holding member 180 has a communication hole 182. The communication hole 182 is formed at a position axially corresponding to the radial depression 161b of the rod holding member 160, and thus allows an inside of the support-member holding member 180 to communicate with an outside of the support-member holding member 180.

In the axle side unit 100 with the configuration described hereinbefore, a reservoir chamber 40 (storage chamber) is defined between the inner surface of the outer member 110 and the outer surfaces of the rod 150 and the support-member holding member 180. The reservoir chamber 40 stores oil kept hermetic in the front fork 21.

Configuration of Body Side Unit 200

The body side unit 200 includes the inner tube 210 and a cap 220. The inner tube 210 has a hollow cylindrical shape with open ends. The cap 220 is mounted on an upper-side end of the inner tube 210.

The body side unit 200 also includes the cylinder 230 and a hermetic member 240. The cylinder 230 has a hollow cylindrical shape. The hermetic member 240 is mounted on a lower-side end of the cylinder 230, and keeps space inside the cylinder 230 hermetic.

The body side unit 200 also includes a front-wheel spring length adjustment unit 250 and the front-wheel passage switch unit 300. The front-wheel spring length adjustment unit 250 supports the front-wheel spring 500 at its upper-side end and adjusts (changes) a length of the front-wheel spring 500. The front-wheel passage switch unit 300 is mounted on an upper-side end of the cylinder 230 and selects a passage for the oil.

The body side unit 200 also includes a front-wheel relative position detector 281 (see FIG. 11). The front-wheel relative position detector 281 detects a position of an upper-side end support member 270 relative to a base member 260, described later, of the front-wheel spring length adjustment unit 250.

Configuration of Cap 220

The cap 220 is an approximately hollow cylindrical member. On the outer surface of the cap 220, a male thread 221 is formed. The male thread 221 is screwed on the female thread 213, which is formed on the inner tube 210. On the inner surface of the cap 220, a female thread is formed that receives male threads on the front-wheel spring length adjustment unit 250 and the front-wheel passage switch unit 300. The cap 220 is mounted on the inner tube 210 and holds the front-wheel spring length adjustment unit 250 and the front-wheel passage switch unit 300.

The cap 220 includes an O ring 222. The O ring 222 keeps the space inside the inner tube 210 liquid tight.

Configuration of Front-Wheel Spring Length Adjustment Unit 250

The front-wheel spring length adjustment unit 250 includes the base member 260 and the upper-side end support member 270. The base member 260 is secured on the cap 220. The upper-side end support member 270 supports the front-wheel spring 500 at its upper-side end, and is movable in the axial direction relative to the base member 260. Thus, the upper-side end support member 270 adjusts the length of the front-wheel spring 500.

The base member 260 is an approximately hollow cylindrical member. The base member 260 has a protrusion 260b at an upper-side end of the base member 260. The protrusion 260b is a radially protruding part of a circumference of the base member 260. A discharge passage 41 is disposed between the protrusion 260b and a lower-side end on an outer surface of a support member 400, described later. The discharge passage 41 is for the oil in the cylinder 230 to be discharged into the reservoir chamber 40. A ring-shaped passage 61 is defined between an inner surface of the base member 260 and an outer surface of the cylinder 230. The ring-shaped passage 61 has a ring shape.

The upper-side end support member 270 includes a hollow cylindrical portion 271 and an internally facing portion 272. The hollow cylindrical portion 271 has a hollow cylindrical shape. The internally facing portion 272 radially internally extends from the lower-side end of the hollow cylindrical portion 271. The upper-side end support member 270 defines a jack chamber 60 in the space defined between the outer surface of the cylinder 230 and the lower-side end of the base member 260. The jack chamber 60 stores oil for use in adjusting the relative position of the upper-side end support member 270 relative to the base member 260.

The hollow cylindrical portion 271 has a radial through hole 273. The radial through hole 273 radially penetrates the hollow cylindrical portion 271 and thus allows an inside of the hollow cylindrical portion 271 to communicate with an outside of the hollow cylindrical portion 271. Through the radial through hole 273, the oil in the jack chamber 60 is discharged into the reservoir chamber 40. In this manner, the displacement of the upper-side end support member 270 relative to the base member 260 is limited.

The jack chamber 60 is supplied the oil in the cylinder 230 through the ring-shaped passage 61, which is defined between the inner surface of the base member 260 and the outer surface of the cylinder 230. This configuration will be detailed later.

Configuration of Front-Wheel Relative Position Detector 281

The front-wheel relative position detector 281 (see FIG. 11) detects, for example, an amount of displacement of the upper-side end support member 270 in the vertical direction relative to the base member 260, that is, an amount of displacement of the upper-side end support member 270 in the vertical direction relative to the body frame 11. In a non-limiting embodiment, a coil is wound around the outer surface of the base member 260, and the upper-side end support member 270 is made of magnetic material. Based on an impedance of the coil, which changes in accordance with the displacement of the upper-side end support member 270 in the vertical direction relative to the base member 260, the front-wheel relative position detector 281 detects the amount of displacement of the upper-side end support member 270.

Configuration of Front-Wheel Passage Switch Unit 300

Figure 3:
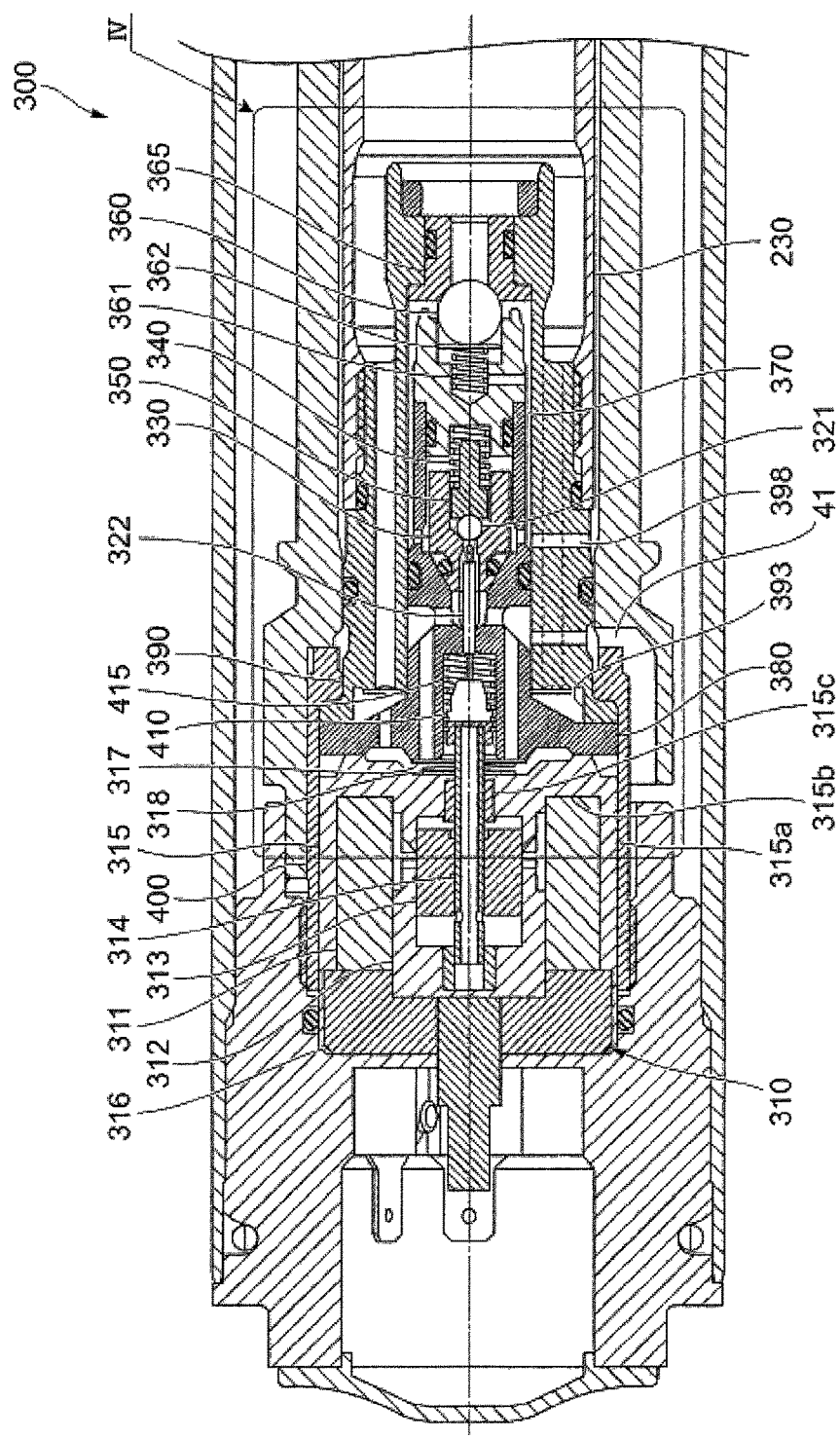
FIG. 3 is an enlarged view of part III illustrated in FIG. 2.

FIG. 3 is an enlarged view of part III illustrated in FIG. 2.

Figure 4:
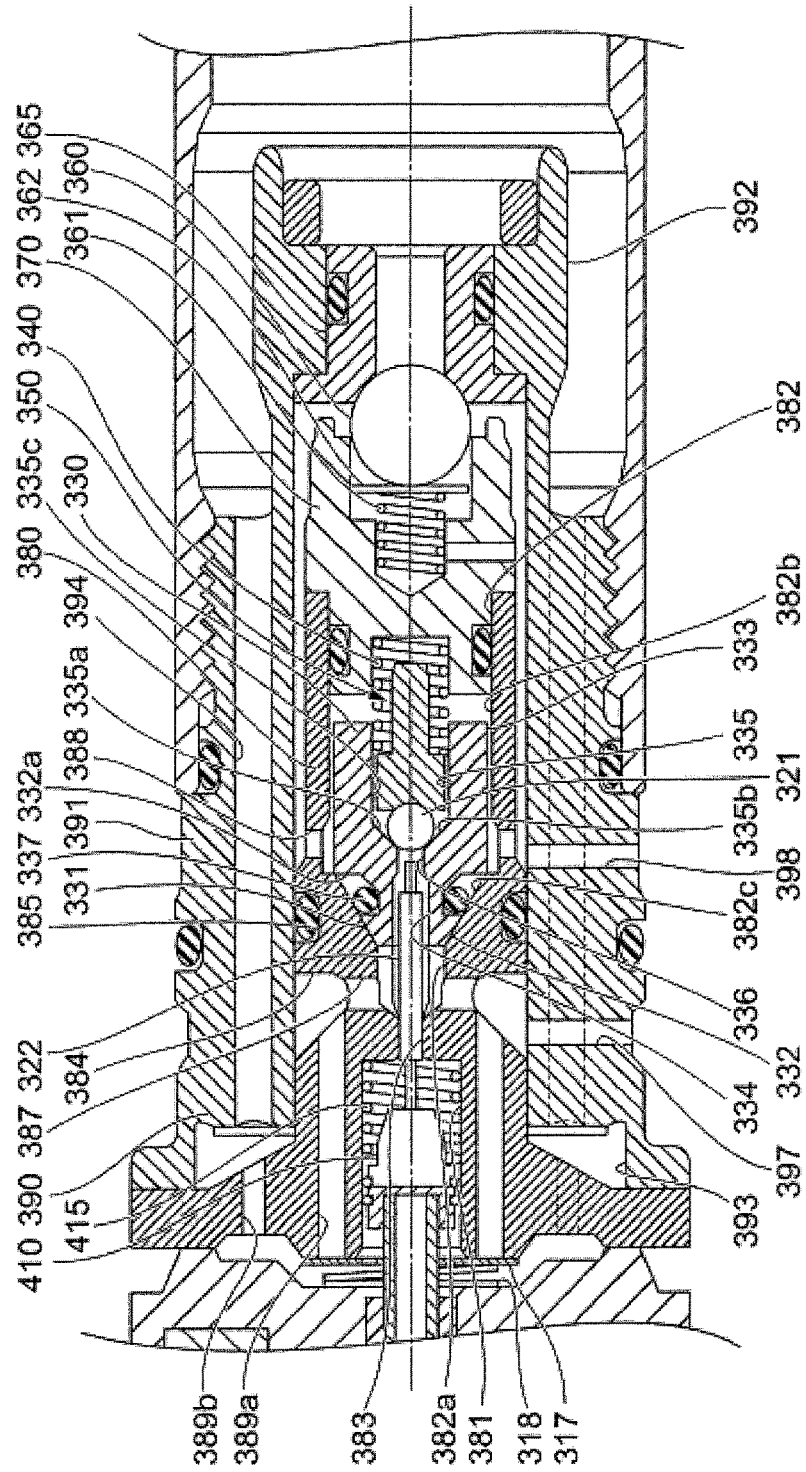
FIG. 4 is an enlarged view of part IV illustrated in FIG. 3.

FIG. 4 is an enlarged view of part IV illustrated in FIG. 3.

The front-wheel passage switch unit 300 is a device that switches among a first option, a second option, and a third option. In the first option, the front-wheel passage switch unit 300 supplies oil discharged from a pump 600, described later, to the reservoir chamber 40. In the second option, the front-wheel passage switch unit 300 supplies the oil discharged from the pump 600 to the jack chamber 60. In the third option, the front wheel passage switch unit 300 supplies the oil accommodated in the jack chamber 60 to the reservoir chamber 40.

The front-wheel passage switch unit 300 includes a front-wheel solenoid 310, a spherical valve body 321, a push rod 322, a valve-body seat member 330, a coil spring 340, and a press member 350. The push rod 322 presses the valve body 321. The valve-body seat member 330 has a resting surface for the valve body 321. The press member 350 receives the spring force of the coil spring 340 to press the valve body 321 against the resting surface.

The front-wheel passage switch unit 300 also includes a ball 360, a coil spring 361, and a disc 362. The coil spring 361 applies axial urging force to the ball 360. The disc 362 is disposed between the ball 360 and the coil spring 361. The front-wheel passage switch unit 300 also includes a ball seat member 365 and an accommodation member 370. The ball seat member 365 has a resting surface for the ball 360. The accommodation member 370 accommodates the coil spring 361 and the disc 362.

The front-wheel passage switch unit 300 also includes a valve accommodation inner member 380, a valve accommodation outer member 390, and the support member 400. The valve accommodation inner member 380 accommodates the valve body 321, the valve-body seat member 330, and other members. The valve accommodation outer member 390 is disposed outside the valve accommodation inner member 380, and accommodates the ball 360, the ball seat member 365, and other members. The support member 400 supports the valve accommodation inner member 380 and the valve accommodation outer member 390.

The front-wheel passage switch unit 300 also includes a transmission member 410 and a coil spring 415. The transmission member 410 is mounted on the lower end of an operation rod 314, described later, of the front-wheel solenoid 310, and transmits thrust of the front-wheel solenoid 310 to the push rod 322. The coil spring 415 applies axial urging force to the transmission member 410.

Configuration of Front-Wheel Solenoid 310

The front-wheel solenoid 310 is a proportional solenoid that includes a coil 311, a core 312, a plunger 313, and an operation rod 314. The core 312 is disposed inside the coil 311. The plunger 313 is guided by the core 312. The operation rod 314 is coupled to the plunger 313.

The front-wheel solenoid 310 also includes a case 315 and a cover 316. The case 315 accommodates the coil 311, the core 312, the plunger 313, and other members. The cover 316 covers an opening of the case 315.

The case 315 includes a hollow cylindrical portion 315a and an internally facing portion 315b. The hollow cylindrical portion 315a has a hollow cylindrical shape. The internally facing portion 315b radially internally extends from the lower-side end of the hollow cylindrical portion 315a. The internally facing portion 315b has a through hole through which the operation rod 314 is inserted. A guide bush 315c is fitted with the internally facing portion 315b to guide the movement of the operation rod 314.

The operation rod 314 has a hollow cylindrical shape. At the upper-side end, the operation rod 314 is accommodated in the case 315. At the lower-side end, the operation rod 314 protrudes from the case 315. The portion of the operation rod 314 protruding from the case 315 is attached with a disc-shaped valve 317. The disc-shaped valve 317 opens and closes a passage, described later, formed in the valve accommodation inner member 380. A coil spring 318 surrounds the portion of the operation rod 314 between the valve 317 and the case 315. The coil spring 318 applies an axial urging force to the valve 317.

With the configuration of the front-wheel solenoid 310 described hereinbefore, the coil 311 is supplied a current through a connector and a lead that are mounted on the cap 220. The current causes the plunger 313 to generate an axial thrust that accords with the amount of the current. The thrust of the plunger 313 causes the operation rod 314, which is coupled to the plunger 313, to make an axial movement. In the front-wheel solenoid 310 according to this embodiment, the plunger 313 generates an amount of axial thrust that causes the operation rod 314 to protrude from the case 315 by an amount that increases as the current supplied to the coil 31 increases.

The amount of the current supplied to the coil 311 is controlled by the controller 70.

Configuration of Valve-Body Seat Member 330

The valve-body seat member 330 includes a conical portion 332 and a solid cylindrical portion 333. The conical portion 332 has an inclined surface 331. The inclined surface 331 is inclined relative to the axial direction, that is, the outer diameter of the valve-body seat member 330 gradually increases in the lower side direction. The solid cylindrical portion 333 has a solid cylindrical shape.

The conical portion 332 has an upper-end depression 334. The upper-end depression 334 is depressed over a depth in the axial direction from an upper-side end surface of the conical portion 332. The solid cylindrical portion 333 has a lower-end depression 335 and a communication hole 336. The lower-end depression 335 is depressed over a depth in the axial direction from a lower-side end surface of the solid cylindrical portion 333. The communication hole 336 allows the lower-end depression 335 to communicate with the upper-end depression 334.

The lower-end depression 335 includes a conical depression 335b and a cylindrical depression 335c. The conical depression 335b, which has a conical shape, has an inclined surface 335a. The inclined surface 335a is inclined relative to the axial direction, that is, a radius of the conical depression 335b gradually increases in the lower side direction. The cylindrical depression 335c has a cylindrical shape.

The conical portion 332 has a groove 332a on an outer surface of the conical portion 332. The groove 332a is depressed radially throughout a circumference of the conical portion 332. An O ring 337 is fitted in the groove 332a to seal a gap between the conical portion 332 and the valve accommodation inner member 380.

Configuration of Valve Accommodation Inner Member 380

The valve accommodation inner member 380 is an approximately solid cylindrical member with a flange formed at the upper-side end of the valve accommodation inner member 380. The valve accommodation inner member 380 has an upper-end depression 381, a lower-end depression 382, and a communication hole 383. The upper-end depression 381 is depressed over a depth in the axial direction from the upper-side end surface of the valve accommodation inner member 380. The lower-end depression 382 is depressed over a depth in the axial direction from the lower-side end surface of the valve accommodation inner member 380. Through the communication hole 383, the upper-end depression 381 and the lower-end depression 382 communicate with each other.

On the outer surface of the valve accommodation inner member 380, a first radial depression 384 and a second radial depression 385 are formed. The first radial depression 384 and the second radial depression 385 are depressed radially throughout the circumference of the valve accommodation inner member 380.

The upper-end depression 381 has a solid cylindrical shape that accommodates the transmission member 410 and the coil spring 415.

The lower-end depression 382 includes a first cylindrical depression 382a, a second cylindrical depression 382b, and a conical depression 382c. The first cylindrical depression 382a and the second cylindrical depression 382b have cylindrical shapes of different diameters. The conical depression 382c is formed between the first cylindrical depression 382a and the second cylindrical depression 382b, and has an inclined surface inclined relative to the axial direction, that is, the radius of the conical depression 382c gradually increases in the lower side direction.

The valve accommodation inner member 380 has a plurality of first radial communication holes 387, which are formed at equal intervals in the circumferential direction. Each first radial communication hole 387 is a radial through hole through which the first cylindrical depression 382a of the lower-end depression 382 and the first radial depression 384 communicate with each other.

The valve accommodation inner member 380 has a plurality of second radial communication holes 388, which are formed at equal intervals in the circumferential direction. Each second radial communication hole 388 is a radial through hole through which the second cylindrical depression 382b and the outside of the valve accommodation inner member 380 communicate with each other.

The valve accommodation inner member 380 has a plurality of inner axial communication holes 389a formed at equal intervals in the circumferential direction. Each inner axial communication hole 389a is an axial through hole through which the upper-side end of the valve accommodation inner member 380 and the first radial depression 384 communicate with each other.

The valve accommodation inner member 380 has a plurality of outer axial communication holes 389b formed at equal intervals in the circumferential direction. The outer axial communication holes 389b axially penetrate the flange.

Configuration of Valve Accommodation Outer Member 390

The valve accommodation outer member 390 includes a first hollow cylindrical portion 391, a second hollow cylindrical portion 392, and a flange. The first hollow cylindrical portion 391 and the second hollow cylindrical portion 392 have cylindrical shapes of different diameters. The flange extends radially outwardly from the upper-side end of the first hollow cylindrical portion 391. The first hollow cylindrical portion 391 has an outer diameter larger than the outer diameter of the second hollow cylindrical portion 392.

The valve accommodation outer member 390 has an upper-end depression 393. The upper-end depression 393 is depressed over a depth in the axial direction from the upper-side end surface of the valve accommodation outer member 390.

The first hollow cylindrical portion 391 has a plurality of axial communication holes 394, which are formed at equal intervals in the circumferential direction. Each axial communication hole 394 allows the upper-end depression 393 to communicate with the space that is below the first hollow cylindrical portion 391 and defined between the outer surface of the second hollow cylindrical portion 392 and the inner surface of the cylinder 230.

The first hollow cylindrical portion 391 has a plurality of first radial communication holes 397 and a plurality of second radial communication holes 398. The first radial communication holes 397 and the second radial communication holes 398 are radial through holes that allow an inside of the first hollow cylindrical portion 391 to communicate with an outside of the first hollow cylindrical portion 391. The first radial communication holes 397 and the second radial communication holes 398 are formed at equal intervals in the circumferential direction and at positions on the first hollow cylindrical portion 391 where no axial communication holes 394 are formed.

With the configuration of the front-wheel passage switch unit 300 described hereinbefore, when supply of current to the coil 311 of the front-wheel solenoid 310 is stopped or when the current supplied to the coil 311 is less than a predetermined first reference current, the valve 317, which is mounted on the operation rod 314, does not rest on the upper-side end surface of the valve accommodation inner member 380. This releases open the opening on the upper end side of the inner axial communication hole 389a, which is formed in the valve accommodation inner member 380.

When the current supplied to the coil 311 of the front-wheel solenoid 310 is equal to or higher than the first reference current, the operation rod 314 moves in the lower side direction to make the valve 317, which is mounted on the operation rod 314, rest on the upper-side end surface of the valve accommodation inner member 380 to close the opening on the upper end side of the inner axial communication hole 389a.

When the current supplied to the coil 311 of the front-wheel solenoid 310 is equal to or higher than a predetermined second reference current, which is higher than the first reference current, the operation rod 314 moves further in the lower side direction. Then, the operation rod 314 pushes the push rod 322 in the lower side direction through the transmission member 410. When the push rod 322 is pushed in the lower side direction, the valve body 321 is pushed by the push rod 322 away from the inclined surface 335a of the lower-end depression 335 of the valve-body seat member 330.

When the supply of current to the coil 311 is stopped or when the current supplied to the coil 311 is less than the first reference current, the valve 317, which is mounted on the operation rod 314, releases the inner axial communication hole 389a, which is formed in the valve accommodation inner member 380, and the valve body 321 rests on the inclined surface 335a of the lower-end depression 335 of the valve-body seat member 330. This state will be hereinafter referred to as first switch state.

When the current supplied to the coil 311 is equal to or higher than the first reference current and less than the second reference current, the valve 317, which is mounted on the operation rod 314, closes the inner axial communication hole 389a, which is formed in the valve accommodation inner member 380, and the valve body 321 rests on the inclined surface 335a of the lower-end depression 335 of the valve-body seat member 330. This state will be hereinafter referred to as second switch state.

When the current supplied to the coil 311 is equal to or higher than the second reference current and less than a third reference current, the valve 317, which is mounted on the operation rod 314, closes the inner axial communication hole 389a, which is formed in the valve accommodation inner member 380, and the valve body 321 is away from the inclined surface 335a of the lower-end depression 335 of the valve-body seat member 330. This state will be hereinafter referred to as a third switch state.

The first reference current and the second reference current are respectively 0.1 A and 0.5 A, for example. The maximum current flowing to the coil 311 of the front-wheel solenoid 310 is 3.2 A, for example.

When the current supplied to the coil 311 is equal to or higher than the third reference current, the valve 317, which is mounted on the operation rod 314, closes the inner axial communication hole 389a, which is formed in the valve accommodation inner member 380, and the inclined surface 331 of the conical portion 332 of the valve-body seat member 330 is away from the inclined surface on the conical depression 382c of the valve accommodation inner member 380. This state will be hereinafter referred to as fourth switch state. In the fourth switch state, the valve body 321 rests on the inclined surface 335a of the lower-end depression 335 of the valve-body seat member 330.

Operation of Front Fork 21

With the configuration of the front fork 21 described hereinbefore, the front-wheel spring 500 supports the weight of the motorcycle 1 and thus absorbs impact. The attenuation force generation unit 130 attenuates the vibration in the front-wheel spring 500.

Figure 5:
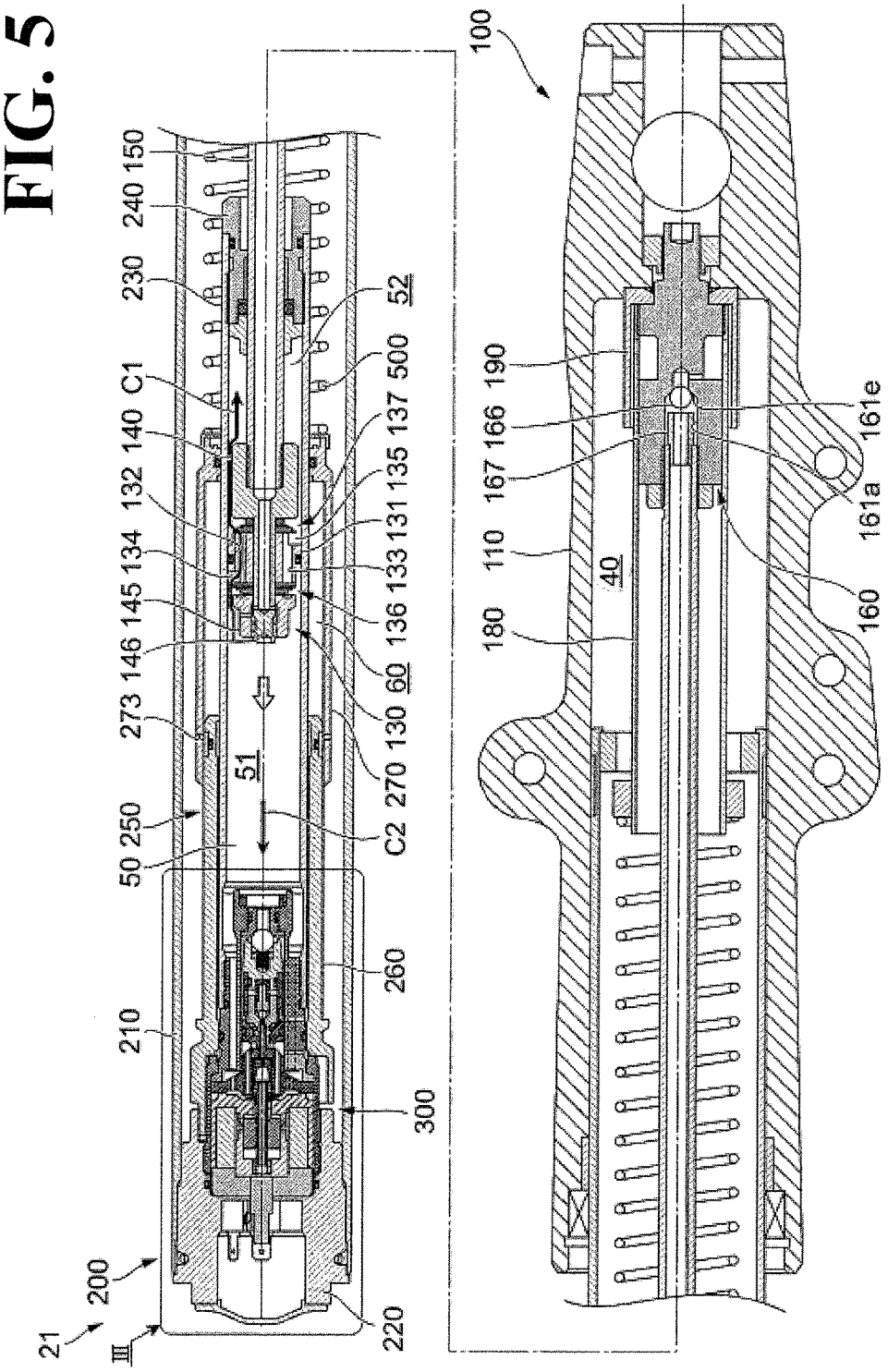
FIG. 5 illustrates how the front fork operates at a time of a compression stroke.

FIG. 5 illustrates how the front fork 21 operates at the time of a compression stroke.

In the compression stroke of the front fork 21, the piston 131 of the attenuation force generation unit 130 moves in the upper-side direction relative to the cylinder 230 as indicated by the outlined arrow. The movement of the piston 131 causes the oil in the first oil chamber 51 to be pressurized. This causes the lower-end side valve 137 covering the first through hole 132 to open and the oil to flow into the second oil chamber 52 through the first through hole 132 (see arrow C1). The oil flow from the first oil chamber 51 to the second oil chamber 52 is narrowed through the first through hole 132 and the lower-end side valve 137. This causes attenuation force for the compression stroke to be generated.

At the time of the compression stroke, the rod 150 enters the cylinder 230. The entry causes an amount of oil corresponding to the volume of the rod 150 in the cylinder 230 to be supplied to the jack chamber 60 or the reservoir chamber 40, which depends on the switch state selected by the front-wheel passage switch unit 300 (see arrow C2). The switch state selected by the front-wheel passage switch unit 300 as to which of the jack chamber 60 and the reservoir chamber 40 to supply the oil will be described later. Here, the attenuation force generation unit 130, the rod 150, the cylinder 230, and other elements function as a pump to supply the oil in the cylinder 230 to the jack chamber 60 or the reservoir chamber 40. In the following description, this pump will occasionally be referred to as "pump 600".

Figure 6:
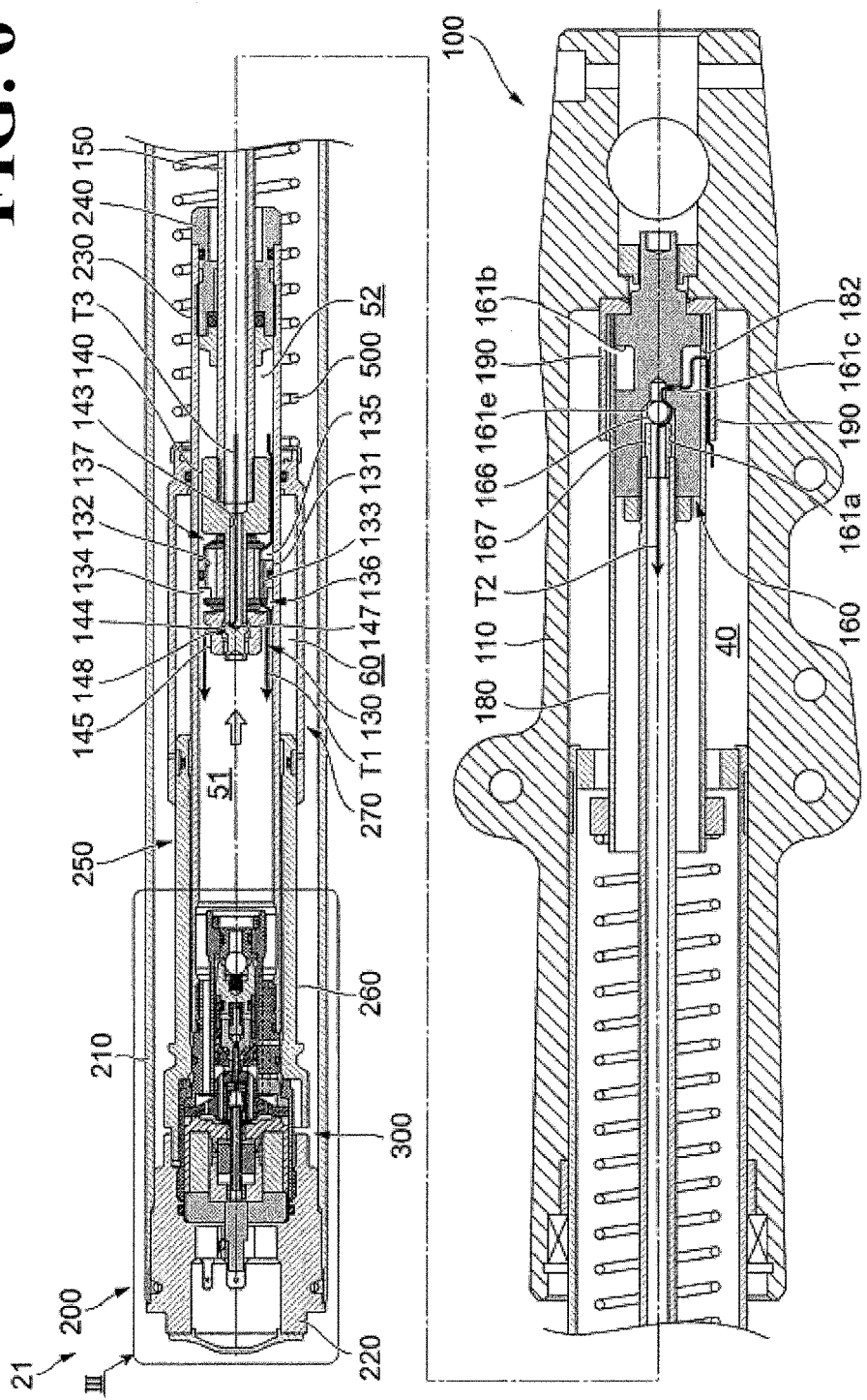
FIG. 6 illustrates how the front fork operates at a time of a rebound stroke.

FIG. 6 illustrates how the front fork 21 operates at the time of a rebound stroke.

In the rebound stroke of the front fork 21, the piston 131 of the attenuation force generation unit 130 moves in the lower-side direction relative to the cylinder 230 as indicated by the outlined arrow. The movement of the piston 131 causes the oil in the second oil chamber 52 to be pressurized. This causes the upper-end side valve 136 covering the second through hole 133 to open and the oil to flow into the first oil chamber 51 through the second through hole 133 (see arrow T1). The oil flow from the second oil chamber 52 to the first oil chamber 51 is narrowed through the second through hole 133 and the upper-end side valve 136. This causes attenuation force for the rebound stroke to be generated.

At the time of the rebound stroke, the rod 150 withdraws from the cylinder 230. The withdrawal causes an amount of oil corresponding to the volume of the rod 150 that has been in the cylinder 230 to be supplied from the reservoir chamber 40 to the first oil chamber 51. That is, the movement of the piston 131 in the lower-side direction causes the first oil chamber 51 to be depressurized and the oil in the reservoir chamber 40 to enter the first oil chamber 51. Specifically, the oil in the reservoir chamber 40 passes through the communication hole 182 of the support-member holding member 180 and the radial through hole 161c of the rod holding member 160, and enters the axial depression 161a of the rod holding member 160. Then, the oil moves the ball 166 in the upper-side direction and enters the rod 150 (see arrow T2). In the rod 150, the oil passes through the depression 143 of the piston bolt 140, the radial through hole 144, and the radial through hole 148 of the nut 145, and reaches the first oil chamber 51 (see arrow T3).

Thus, the communication hole 182 of the support-member holding member 180, the radial through hole 161c of the rod holding member 160, the axial depression 161a of the rod holding member 160, an inside of the rod 150, the depression 143 of the piston bolt 140, the radial through hole 144, and the radial through hole 148 of the nut 145 function as intake passages through which the oil is taken from the reservoir chamber 40 into the cylinder 230 (first oil chamber 51). The ball 166 and the inclined surface 161e, which is formed on the axial depression 161a of the rod holding member 160, function as a check valve that allows the oil to flow from the reservoir chamber 40 into the inside of the rod 150 and that limits discharge of the oil from the inside of the rod 150 to the reservoir chamber 40.

Figure 7:
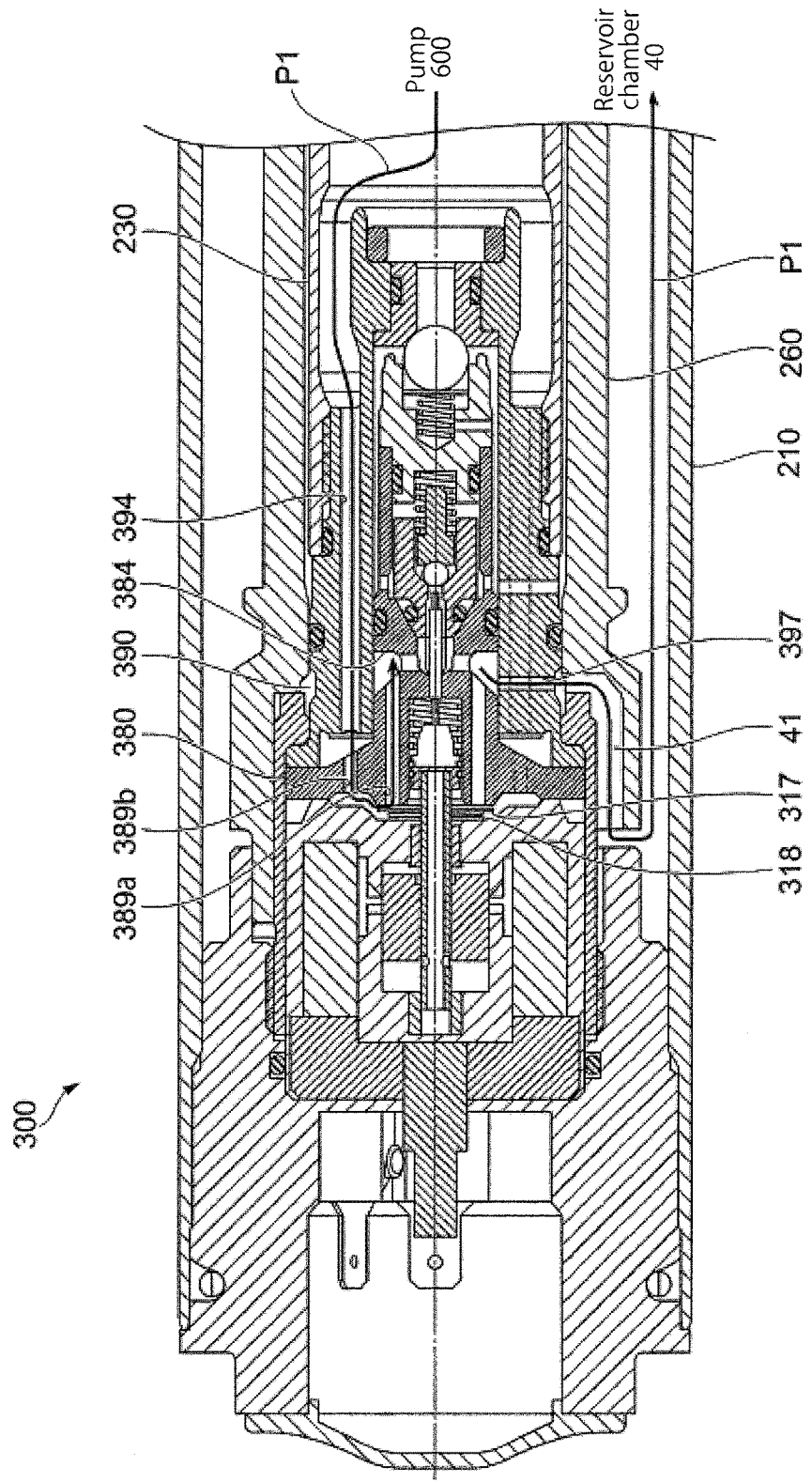
FIG. 7 illustrates a flow of oil in a front-wheel passage switch unit in a first switch state.

FIG. 7 illustrates a flow of oil in the front-wheel passage switch unit 300 in the first switch state.

When the front-wheel passage switch unit 300 is in the first switch state at the time of the compression stroke of the front fork 21, oil discharged from the pump 600, which is made up of members such as the attenuation force generation unit 130, the rod 150, and the cylinder 230, flows in the upper side direction through the axial communication holes 394, which are formed in the valve accommodation outer member 390 as indicated by arrow P1 in FIG. 7. The oil that has flowed in the upper side direction through the axial communication holes 394, which are formed in the valve accommodation outer member 390, flows in the upper side direction through the outer axial communication hole 389b of the valve accommodation inner member 380, and then flows in the lower side direction through the inner axial communication hole 389a, which is open. Then, the oil flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the axial communication holes 394 of the valve accommodation outer member 390, the outer axial communication hole 389b and the inner axial communication hole 389a of the valve accommodation inner member 380, the first radial communication holes 397 of the valve accommodation outer member 390, and the discharge passage 41 function as a first communication passage R1 (see FIG. 11). Through the first communication passage R1, the cylinder 230 and the reservoir chamber 40 communicate with each other. The valve 317, which is mounted on the operation rod 314, the coil spring 318, and the upper-side end of the valve accommodation inner member 380 function as a first communication passage switch valve V1 (see FIG. 11). The first communication passage switch valve V1 opens and closes the first communication passage R1.

Figure 8:
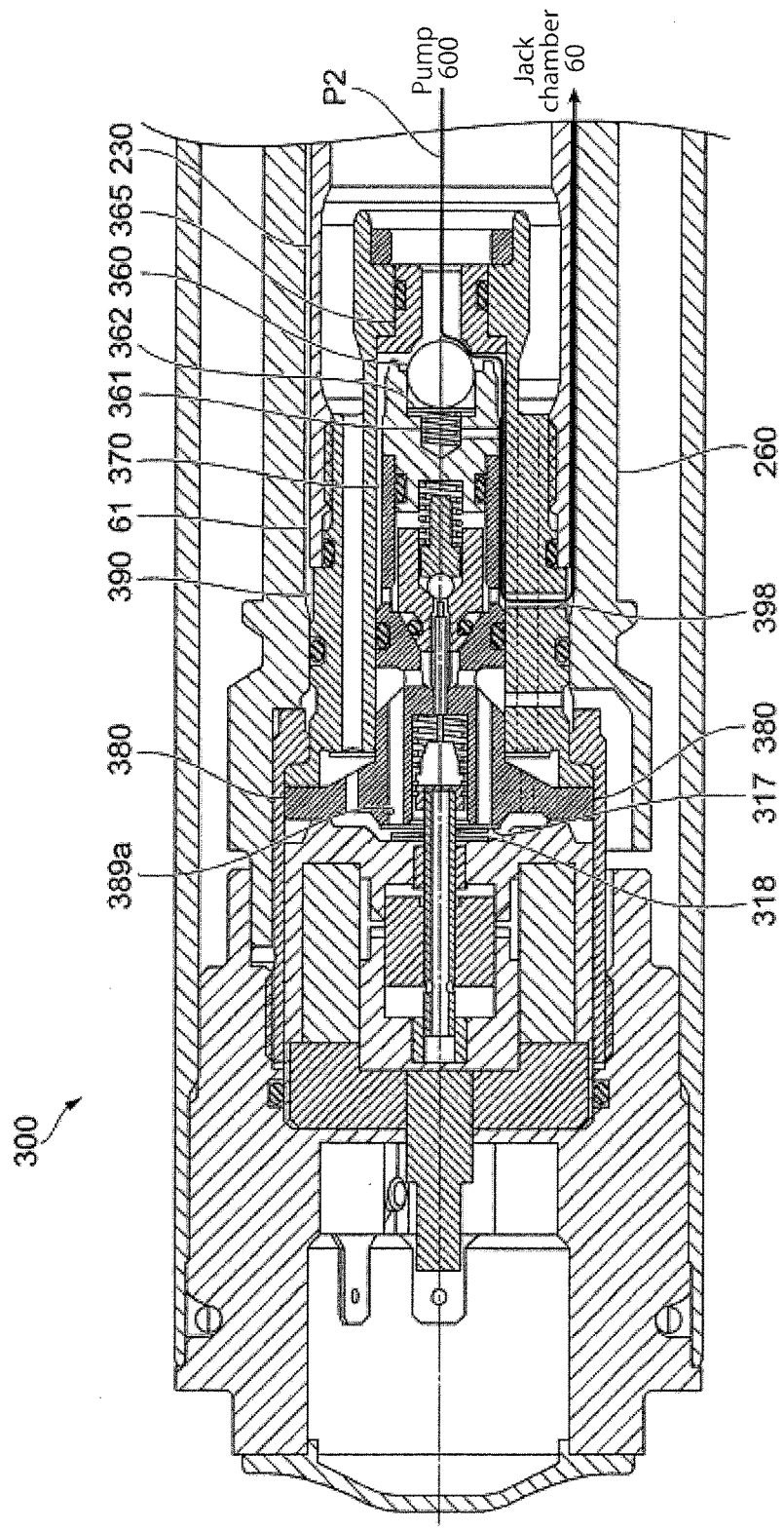
FIG. 8 illustrates a flow of the oil in the front-wheel passage switch unit in a second switch state.

FIG. 8 illustrates a flow of oil in the front-wheel passage switch unit 300 in the second switch state.

When the front-wheel passage switch unit 300 is in the second switch state at the time of the compression stroke of the front fork 21, the valve 317, which is mounted on the operation rod 314, closes the inner axial communication hole 389a, which is formed in the valve accommodation inner member 380. This causes the oil discharged from the pump 600 to flow to the jack chamber 60 as indicated by arrow P2 in FIG. 8. Specifically, the oil discharged from the pump 600 pushes up the ball 360 against the urging force of the coil spring 361, and flows in the upper side direction through the gap between the outer surface of the valve accommodation inner member 380 and the inner surface of the valve accommodation outer member 390 and the gap between the outer surface of the accommodation member 370 and the inner surface of the valve accommodation outer member 390. Then, the oil flows to the outside of the valve accommodation outer member 390 through the second radial communication holes 398 of the valve accommodation outer member 390. The oil that has passed through the second radial communication holes 398 flows to the jack chamber 60 through the ring-shaped passage 61, which is defined between the outer surface of the cylinder 230 and the inner surface of the base member 260 of the front-wheel spring length adjustment unit 250.

Thus, the gap between the outer surface of the valve accommodation inner member 380 and the inner surface of the valve accommodation outer member 390, the gap between the outer surface of the accommodation member 370 and the inner surface of the valve accommodation outer member 390, the second radial communication holes 398 of the valve accommodation outer member 390, and the ring-shaped passage 61 function as a second communication passage R2 (see FIG. 11). Through the second communication passage R2, the cylinder 230 and the jack chamber 60 communicate with each other. The ball 360, the coil spring 361, the disc 362, and the ball seat member 365 function as a second communication passage switch valve V2 (see FIG. 11). The second communication passage switch valve V2 opens and closes the second communication passage R2. The second communication passage switch valve V2 also functions as a check valve that allows oil to flow from the inside of the cylinder 230 into the jack chamber 60 and that inhibits the oil from flowing from the jack chamber 60 into the cylinder 230.

Figure 9:
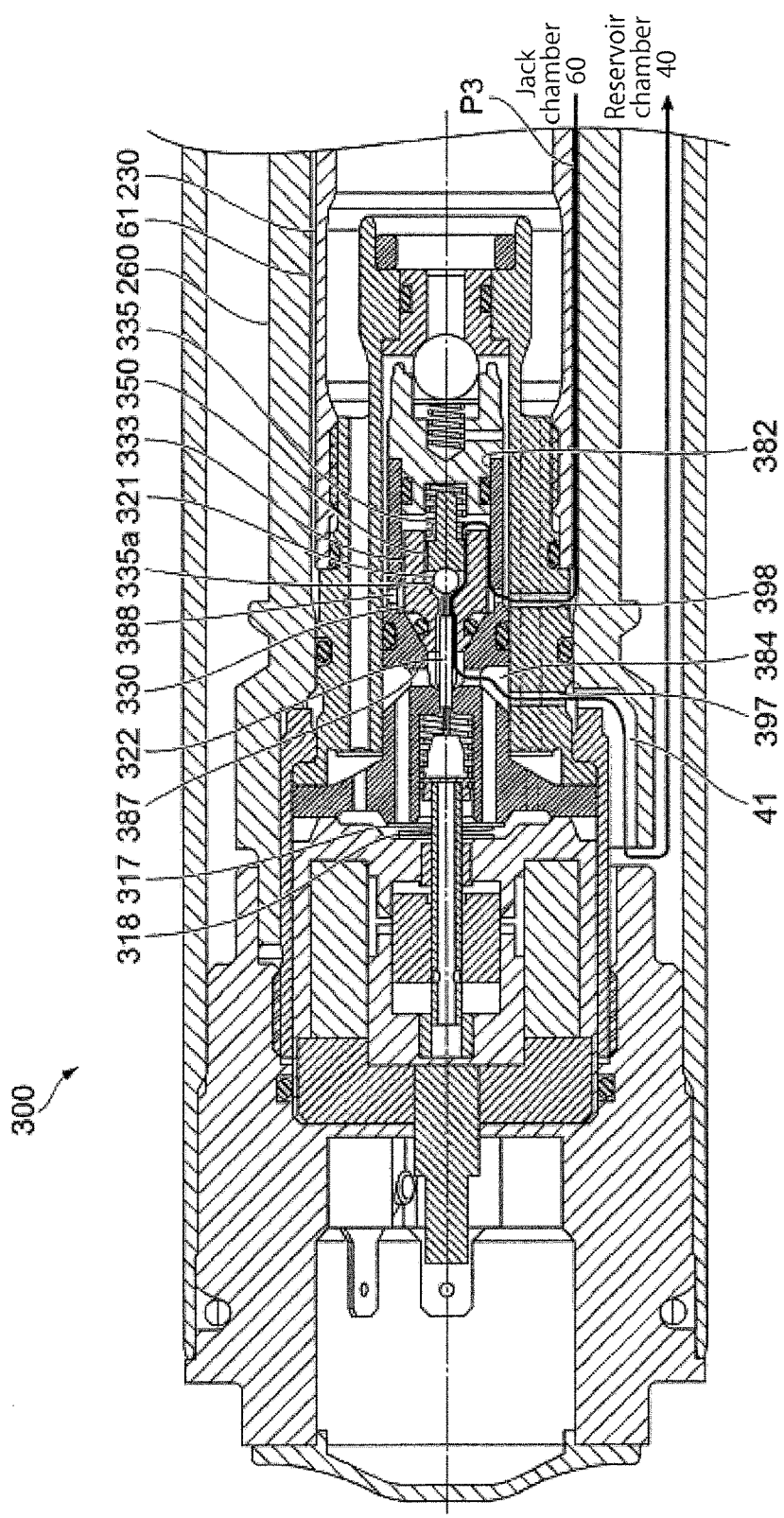
FIG. 9 illustrates a flow of the oil in the front-wheel passage switch unit in a third switch state.

FIG. 9 illustrates a flow of oil in the front-wheel passage switch unit 300 in the third switch state.

When the front-wheel passage switch unit 300 is in the third switch state at the time of the compression stroke of the front fork 21, the oil in the jack chamber 60 flows to the reservoir chamber 40 as indicated by arrow P3 in FIG. 9. Specifically, the oil in the jack chamber 60 enters the lower-end depression 382 of the valve accommodation inner member 380 through the ring-shaped passage 61, which is defined between the outer surface of the cylinder 230 and the inner surface of the base member 260 of the front-wheel spring length adjustment unit 250, through the second radial communication holes 398 of the valve accommodation outer member 390, and through the second radial communication holes 388 of the valve accommodation inner member 380.

The oil that has entered the lower-end depression 382 of the valve accommodation inner member 380 flows in the lower side direction through the gap between the valve accommodation inner member 380 and the outer surface of the solid cylindrical portion 333 of the valve-body seat member 330, and enters the lower-end depression 335 of the valve-body seat member 330. The oil that has entered the lower-end depression 335 of the valve-body seat member 330 flows in the upper side direction through the gap between the press member 350 and the valve body 321 and the gap between the push rod 322 and the valve-body seat member 330, and passes through the first radial communication holes 387 of the valve accommodation inner member 380. The oil that has passed through the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap between the valve accommodation inner member 380 and the outer surface of the solid cylindrical portion 333 of the valve-body seat member 330, the gap between the press member 350 and the valve body 321, the gap between the push rod 322 and the valve-body seat member 330, the first radial communication holes 387 of the valve accommodation inner member 380, the first radial communication holes 397 of the valve accommodation outer member 390, and the discharge passage 41 function as a third communication passage R3 (see FIG. 11). Through the third communication passage R3, the jack chamber 60 and the reservoir chamber 40 communicate with each other. The valve body 321 and the inclined surface 335a of the lower-end depression 335 of the valve-body seat member 330 function as a third communication passage switch valve V3 (see FIG. 11). The third communication passage switch valve V3 opens and closes the third communication passage R3.

Figure 10:
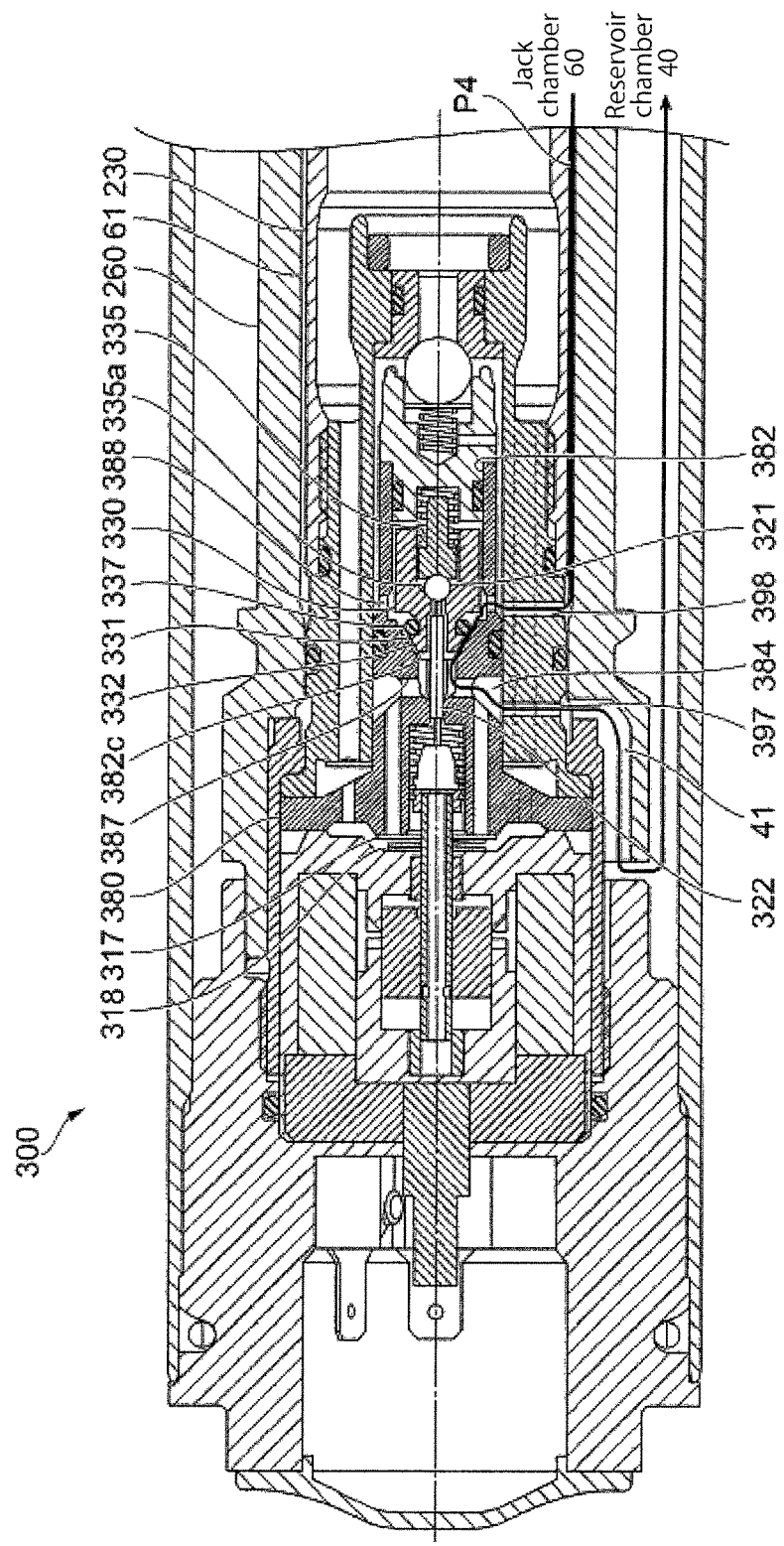
FIG. 10 illustrates a flow of the oil in the front-wheel passage switch unit in a fourth switch state.

FIG. 10 illustrates a flow of oil in the front-wheel passage switch unit 300 in the fourth switch state.

When the front-wheel passage switch unit 300 is in the fourth switch state at the time of the compression stroke of the front fork 21, the oil in the jack chamber 60 flows to the reservoir chamber 40 as indicated by arrow P4 in FIG. 10. Specifically, the oil in the jack chamber 60 enters the lower-end depression 382 of the valve accommodation inner member 380 through the ring-shaped passage 61, the second radial communication holes 398 of the valve accommodation outer member 390, and the second radial communication holes 388 of the valve accommodation inner member 380. The oil that has entered the lower-end depression 382 of the valve accommodation inner member 380 flows in the upper side direction through the gap defined by the inclined surface 331 of the conical portion 332 of the valve-body seat member 330, the O ring 337, and the inclined surface on the conical depression 382c of the valve accommodation inner member 380, and passes through the first radial communication holes 387 of the valve accommodation inner member 380. The oil that has passed the first radial communication holes 387 of the valve accommodation inner member 380 flows to the reservoir chamber 40 through the first radial communication holes 397, which are formed in the valve accommodation outer member 390, and through the discharge passage 41, which is defined between the protrusion 260b of the base member 260 and the lower-side end of the support member 400.

Thus, the ring-shaped passage 61, the second radial communication holes 398 of the valve accommodation outer member 390, the second radial communication holes 388 of the valve accommodation inner member 380, the gap defined by the inclined surface 331 of the valve-body seat member 330, the O ring 337, and the inclined surface on the conical depression 382c of the valve accommodation inner member 380, the first radial communication holes 387 of the valve accommodation inner member 380, the first radial communication holes 397 of the valve accommodation outer member 390, and the discharge passage 41 function as a fourth communication passage R4 (not illustrated). Through the fourth communication passage R4, the jack chamber 60 and the reservoir chamber 40 communicate with each other. The inclined surface 331 of the conical portion 332 of the valve-body seat member 330, the O ring 337, and the inclined surface on the conical depression 382c of the valve accommodation inner member 380 function as a fourth communication passage switch valve V4 (not illustrated). The fourth communication passage switch valve V4 opens and closes the fourth communication passage R4.

Change from Third Switch State to Fourth Switch State of Front-Wheel Passage Switch Unit 300

When the front-wheel passage switch unit 300 is in the third switch state, the oil in the jack chamber 60 flows to the reservoir chamber 40 as indicated by arrow P3 illustrated in FIG. 9. This flow of the oil causes the amount of the oil in the jack chamber 60 to decrease, causing a reduction in length of the front-wheel spring 500. The reduction in length of the spring 500 causes the pressure in the jack chamber 60 to decrease. As a result, the pressure in a back pressure chamber defined between the valve-body seat member 330 and the accommodation member 370 at the time when the front-wheel passage switch unit 300 is in the third switch state is lower than the pressure in the back pressure chamber at the time when the front-wheel passage switch unit 300 is in the second switch state. This causes the valve-body seat member 330 to start to move in the lower side direction.

When the coil 311 of the front-wheel solenoid 310 is supplied a current that is equal to or higher than the third reference current, the push rod 322 moves the valve body 321 further in the lower side direction than when the passage switch unit 300 is in the third switch state. This enlarges the gap between the valve body 321 and the inclined surface 335a of the lower-end depression 335 of the valve-body seat member 330. As a result, the pressure in the jack chamber 60 further decreases, causing a further decrease in the pressure in the back pressure chamber. The further decrease in the pressure in the back pressure chamber causes the valve-body seat member 330 to move in the lower side direction. This causes the inclined surface 331 of the conical portion 332 of the valve-body seat member 330 to move away from the inclined surface on the conical depression 382c of the valve accommodation inner member 380. Thus, the third switch state changes to the fourth switch state.

Communication Passages Open or Closed in Accordance with Switch State Selected by Front-Wheel Passage Switch Unit 300

Figure 11A:
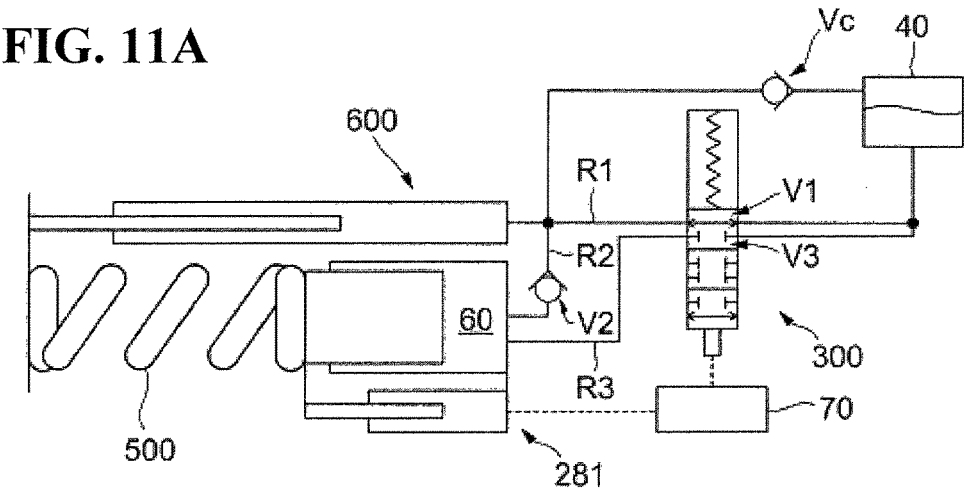
FIG. 11A illustrates whether a first communication passage, a second communication passage, and a third communication passage are open or closed when the front-wheel passage switch unit is in the first switch state.
Figure 11B:
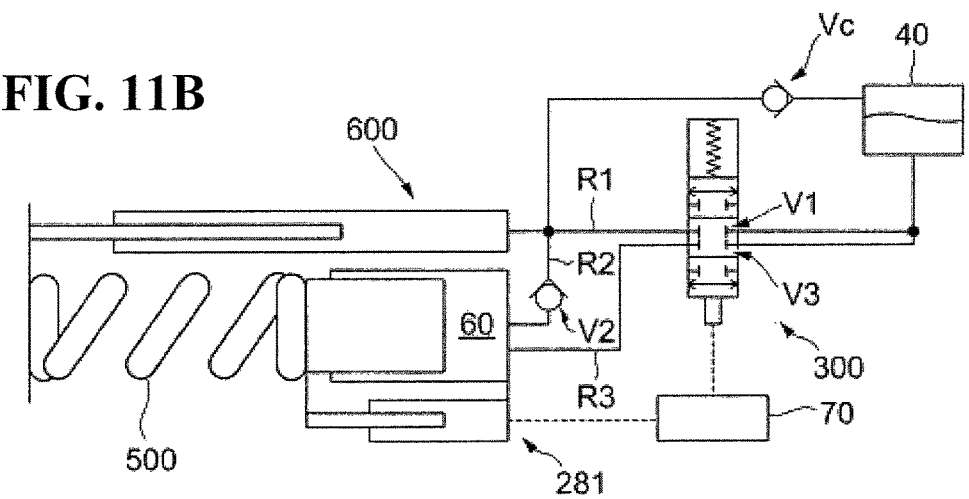
FIG. 11B illustrates whether the first communication passage, the second communication passage, and the third communication passage are open or closed when the front-wheel passage switch unit is in the second switch state.
Figure 11C:
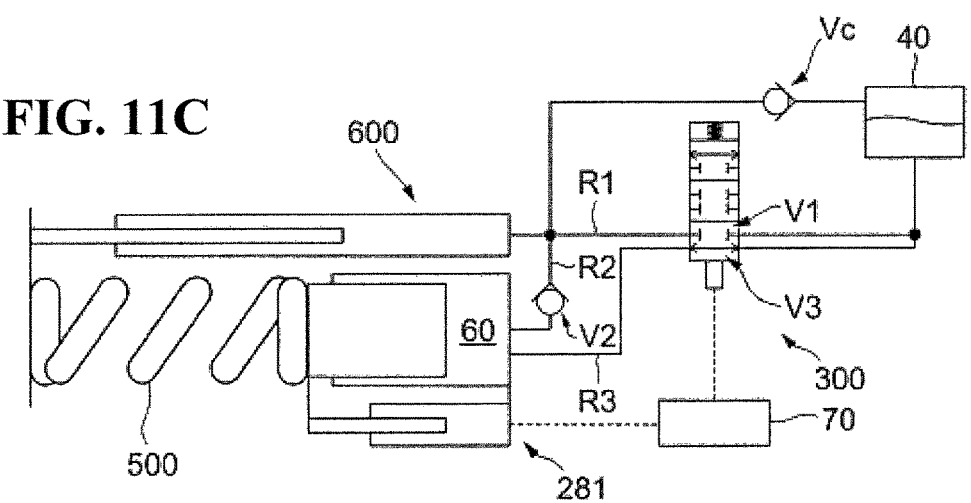
FIG. 11C illustrates whether the first communication passage, the second communication passage, and the third communication passage are open or closed when the front-wheel passage switch unit is in the third switch state.

FIG. 11A illustrates whether the first communication passage R1, the second communication passage R2, and the third communication passage R3 are open or closed when the front-wheel passage switch unit 300 is in the first switch state. FIG. 11B illustrates whether the first communication passage R1, the second communication passage R2, and the third communication passage R3 are open or closed when the front-wheel passage switch unit 300 is in the second switch state. FIG. 11C illustrates whether the first communication passage R1, the second communication passage R2, and the third communication passage R3 are open or closed when the front-wheel passage switch unit 300 is in the third switch state.

As illustrated in FIG. 11A, when the current supplied to the coil 311 of the front-wheel solenoid 310 is less than the first reference current, the front-wheel passage switch unit 300 is in the first switch state. That is, the first communication passage switch valve V1 is open and the third communication passage switch valve V3 is closed. This causes the oil discharged from the pump 600 to reach the reservoir chamber 40 through the first communication passage R1. In this case, the oil discharged from the pump 600 does not have such a high pressure as to open the second communication passage switch valve V2. Hence, the oil does not flow through the second communication passage R2. In other words, since the first communication passage switch valve V1 is open, the second communication passage switch valve V2 is closed. In the first switch state, the oil in the jack chamber 60 does not increase or decrease.

As illustrated in FIG. 11B, when the current supplied to the coil 311 of the front-wheel solenoid 310 is equal to or higher than the first reference current and less than the second reference current, the front-wheel passage switch unit 300 is in the second switch state. That is, the first communication passage switch valve V1 and the third communication passage switch valve V3 are closed. Thus, the oil discharged from the pump 600 opens the second communication passage switch valve V2 to reach the jack chamber 60 through the second communication passage R2. In the second switch state, the amount of the oil in the jack chamber 60 increases.

As illustrated in FIG. 11C, when the current supplied to the coil 311 of the front-wheel solenoid 310 is equal to or higher than the second reference current and less than the third reference current, the front-wheel passage switch unit 300 is in the third switch state. That is, the first communication passage switch valve V1 is closed and the third communication passage switch valve V3 is open. This causes the oil in the jack chamber 60 to reach the reservoir chamber 40 through the third communication passage R3. In the third switch state, the amount of the oil in the jack chamber 60 decreases.

When the current supplied to the coil 311 of the front-wheel solenoid 310 is equal to or higher than the third reference current, the front-wheel passage switch unit 300 is in the fourth switch state. That is, the first communication passage switch valve V1 is closed and the fourth communication passage switch valve V4 is open. This causes the oil in the jack chamber 60 to reach the reservoir chamber 40 through the fourth communication passage R4.

The passage defined in the fourth switch state by the gap defined by the inclined surface 331 of the conical portion 332 of the valve-body seat member 330, the O ring 337, and the inclined surface on the valve accommodation inner member 380 is wider than the passage defined in the third switch state by the gap between the valve accommodation inner member 380 and the outer surface of the solid cylindrical portion 333 of the valve-body seat member 330.

The passage defined in the third switch state by the gap between the valve body 321 and the inclined surface 335a on the valve-body seat member 330 is narrower than the passage defined in the third switch state by the gap between the valve accommodation inner member 380 and the outer surface of the solid cylindrical portion 333 of the valve-body seat member 330. Therefore, when the passage switch unit 300 is in the fourth switch state, the amount of the oil in the jack chamber 60 decreases more quickly than when the passage switch unit 300 is in the third switch state.

Up-and-Down of Vehicle Height

In the front fork 21 operating in the above-described manner, when the front-wheel passage switch unit 300 is in the second switch state, the oil discharged from the pump 600 at the time of the compression stroke flows into the jack chamber 60, increasing the amount of oil in the jack chamber 60. The increase in the amount of oil in the jack chamber 60 causes the upper-side end support member 270 to move in the lower-side direction relative to the base member 260 of the front-wheel spring length adjustment unit 250. The movement of the upper-side end support member 270 in the lower-side direction relative to the base member 260 causes the spring length of the front-wheel spring 500 to shorten. The shortened spring length of the front-wheel spring 500 causes the spring force of the front-wheel spring 500 in pressing the upper-side end support member 270 to increase as compared with the spring force before the movement of the upper-side end support member 270 relative to the base member 260. This causes an increase in preset load (pre-load), which is an amount of load that keeps the relative position of the body frame 11 unchanged relative to the position of the front wheel 2 even when force acts from the body frame 11 toward the front wheel 2 side. In this case, the amount of depression of the front fork 21 is smaller when the same amount of force acts in the axial direction from the body frame 11 (seat 19) side. Thus, when the spring length of the front-wheel spring 500 is shortened due to the movement of the upper-side end support member 270 relative to the base member 260, the height of the seat 19 increases as compared with the height of the seat 19 before the movement of the upper-side end support member 270 relative to the base member 260 (that is, the vehicle height increases).

When the front-wheel passage switch unit 300 is in the third switch state or the fourth switch state, the amount of oil in the jack chamber 60 decreases. The decrease in the amount of oil causes the upper-side end support member 270 to move in the upper-side direction relative to the base member 260 of the front-wheel spring length adjustment unit 250. The movement of the upper-side end support member 270 in the upper-side direction relative to the base member 260 causes the spring length of the front-wheel spring 500 to increase. The increased spring length of the front-wheel spring 500 causes the spring force of the front-wheel spring 500 in pressing the upper-side end support member 270 to reduce as compared with the spring force before the movement of the upper-side end support member 270 relative to the base member 260. This causes the preset load (pre-load) to decrease, and the amount of depression of the front fork 21 is larger when the same amount of force acts in the axial direction from the body frame 11 (seat 19) side. Thus, when the spring length of the front-wheel spring 500 is increased due to the movement of the upper-side end support member 270 in the upper-side direction relative to the base member 260, the height of the seat 19 decreases as compared with the height of the seat 19 before the movement of the upper-side end support member 270 relative to the base member 260 (that is, the vehicle height decreases). When the front-wheel passage switch unit 300 is in the fourth switch state, the amount of the oil in the jack chamber 60 decreases more quickly than when the front-wheel passage switch unit 300 is in the third switch state, as described above. Hence, when the front-wheel passage switch unit 300 is in the fourth switch state, the vehicle height decreases more quickly than when the front-wheel passage switch unit 300 is in the third switch state.

When the front-wheel passage switch unit 300 is in the first switch state, the oil discharged from the pump 600 at the time of the compression stroke flows into the reservoir chamber 40, and thus the amount of oil in the jack chamber 60 does not increase or decrease. Thus, the height of the seat 19 is maintained (that is, the vehicle height is maintained).

Configuration of Rear Suspension 22

The rear suspension 22 is disposed between the body 10 and the rear wheel 3 of the motorcycle 1, and supports the rear wheel 3. The rear suspension 22 includes an axle side unit, a body side unit, and a rear-wheel spring 502 (see FIG. 1). The axle side unit is mounted on the axle of the rear wheel 3. The body side unit is mounted on the body 10. The rear-wheel spring 502 is disposed between the axle side unit and the body side unit, and absorbs vibrations transmitted to the rear wheel 3 caused by the roughness of the ground surface. The rear-wheel spring 502 has an upper-side end supported on the body side unit and has a lower-side end supported on the axle side unit.

The axle side unit includes an attenuation force generation unit, a rod 152 (see FIG. 1), and a spring lower-side end support member 153 (see FIG. 1). The attenuation force generation unit generates attenuation force utilizing viscous resistance of oil. The rod 152 holds the attenuation force generation unit. The spring lower-side end support member 153 supports the lower-side end of the rear-wheel spring 502.

The body side unit includes a cylinder 232 (see FIG. 1), a rear-wheel spring length adjustment unit 252 (see FIG. 1), and a rear-wheel passage switch unit 302 (see FIG. 1). The attenuation force generation unit is inserted in the cylinder 232. The rear-wheel spring length adjustment unit 252 supports an upper-side end of the rear-wheel spring 502 to adjust (change) a length of the rear-wheel spring 502. The rear-wheel passage switch unit 302 is mounted outside of the cylinder 232 to switch among the passages of the oil.

The rear suspension 22 also includes a reservoir chamber (which is the storage chamber) and a pump. The reservoir chamber stores the oil. The pump includes the cylinder 232. When a relative distance between the body 10 and the rear wheel 3 increases, the pump takes into the cylinder 232 the oil stored in the reservoir chamber. When the relative distance between the body 10 and the rear wheel 3 decreases, the pump discharges the oil out of the cylinder 232.

Similarly to the front-wheel spring length adjustment unit 250 of the front fork 21, the rear-wheel spring length adjustment unit 252 includes a base member 253 (see FIG. 1) and an upper-side end support member 254 (see FIG. 1). The base member 253 is secured to a side of the body frame 11. The upper-side end support member 254 supports an upper-side end of the rear-wheel spring 502 and moves in the axial direction relative to the base member 253 so as to change the length of the rear-wheel spring 502. The rear-wheel spring length adjustment unit 252 includes a jack chamber (which is the accommodation chamber) that accommodates the oil. The upper-side end support member 254 supports the upper-side end of the rear-wheel spring 502. The rear-wheel spring length adjustment unit 252 adjusts the length of the rear-wheel spring 502 in accordance with an amount of the oil in the jack chamber.

The rear suspension 22 also includes a rear-wheel relative position detector 282 (see FIG. 12) to detect a relative position, relative to the body frame 11, of the member that supports the upper-side end of the rear-wheel spring 502. In a non-limiting embodiment, the rear-wheel relative position detector 282 detects an amount of displacement of the upper-side end support member 254 in the axial direction relative to the base member 253, that is, an amount of displacement of the upper-side end support member 254 in the axial direction relative to the body frame 11. In a non-limiting embodiment, a coil is wound around an outer surface of the base member 253, and the upper-side end support member 254 is made of magnetic material. Based on an impedance of the coil, which changes in accordance with displacement of the upper-side end support member 254 in the vertical direction relative to the base member 253, the rear-wheel relative position detector 282 detects an amount of displacement of the upper-side end support member 254.
Communication Passages Open or Closed in Accordance with Switch State Selected by Rear-Wheel Passage Switch Unit 302

The rear-wheel passage switch unit 302 has a configuration and functions similar to the configuration and functions of the front-wheel passage switch unit 300 of the front fork 21. Specifically, the rear-wheel passage switch unit 302 includes a first communication passage R1, a second communication passage R2, and a third communication passage R3. The first communication passage R1 allows the inside of the cylinder 232 and the reservoir chamber to communicate with each other. The second communication passage R2 allows the inside of the cylinder 232 and the jack chamber to communicate with each other. The third communication passage R3 allows the jack chamber and the reservoir chamber to communicate with each other. The rear-wheel passage switch unit 302 also includes a first communication passage switch valve V1, a second communication passage switch valve V2, and a third communication passage switch valve V3. The first communication passage switch valve V1 opens and closes the first communication passage R1. The second communication passage switch valve V2 opens and closes the second communication passage R2. The third communication passage switch valve V3 opens and closes the third communication passage R3.

When the current supplied to the rear-wheel passage switch unit 302 is less than a predetermined first reference current, the rear-wheel passage switch unit 302 opens the first communication passage R1 and closes the third communication passage R3. When the current supplied to the rear-wheel passage switch unit 302 is equal to or higher than the first reference current and less than a second reference current, the rear-wheel passage switch unit 302 closes the first communication passage R1 and the third communication passage R3. When the current supplied to the rear-wheel passage switch unit 302 is equal to or higher than the second reference current, the rear-wheel passage switch unit 302 opens the third communication passage R3 and closes the first communication passage R1.

Specifically, when the current supplied to the rear-wheel passage switch unit 302 is less than the predetermined first reference current, the rear-wheel passage switch unit 302 allows the inside of the cylinder 232 and the reservoir chamber to communicate with each other to guide the oil discharged from the pump into the reservoir chamber. When the current supplied to the rear-wheel passage switch unit 302 is equal to or higher than the first reference current and less than the second reference current, the rear-wheel passage switch unit 302 allows the inside of the cylinder 232 and the jack chamber to communicate with each other to guide the oil discharged from the pump into the jack chamber. When the current supplied to the rear-wheel passage switch unit 302 is equal to or higher than the second reference current, the rear-wheel passage switch unit 302 allows the jack chamber and the reservoir chamber to communicate with each other to guide the oil accommodated in the jack chamber into the reservoir chamber.

More specifically, when the current supplied to a coil of a rear-wheel solenoid of the rear-wheel passage switch unit 302 is less than the first reference current, the rear-wheel passage switch unit 302 is in a first switch state, in which the first communication passage switch valve V1 is open and the third communication passage switch valve V3 is closed. This causes the oil discharged from the pump to reach the reservoir chamber through the first communication passage R1. In this case, since the oil discharged from the pump does not have such a high pressure as to open the second communication passage switch valve V2, the oil does not flow through the second communication passage R2. In other words, since the first communication passage switch valve V1 is open, the second communication passage switch valve V2 is closed. In the first switch state, the oil in the jack chamber does not increase nor decrease, and consequently, the vehicle height remains unchanged.

When the current supplied to the coil of the rear-wheel solenoid of the rear-wheel passage switch unit 302 is equal to or higher than the first reference current and less than the second reference current, the rear-wheel passage switch unit 302 is in a second switch state, in which the first communication passage switch valve V1 and the third communication passage switch valve V3 are closed. This causes the oil discharged from the pump to open the second communication passage switch valve V2 and reach the jack chamber. In the second switch state, the amount of oil in the jack chamber increases to increase the vehicle height.

When the current supplied to the coil of the rear-wheel solenoid of the rear-wheel passage switch unit 302 is equal to or higher than the second reference current and less than the third reference current, the rear-wheel passage switch unit 302 is in a third switch state, in which the first communication passage switch valve V1 is closed and the third communication passage switch valve V3 is open. This causes the oil in the jack chamber to reach the reservoir chamber through the third communication passage R3. In the third switch state, the amount of oil in the jack chamber decreases to decrease the vehicle height.

When the current supplied to the coil of the rear-wheel solenoid of the rear-wheel passage switch unit 302 is equal to or higher than the third reference current, the rear-wheel passage switch unit 302 is in a fourth switch state, in which the first communication passage switch valve V1 is closed and the fourth communication passage switch valve V4 is open. This causes the oil in the jack chamber to reach the reservoir chamber through the fourth communication passage R4. In the fourth switch state, the amount of oil in the jack chamber decreases more quickly to decrease the vehicle height more quickly than in the third switch state.
Configuration of Controller 70

The controller 70 will be described below.

Figure 12:
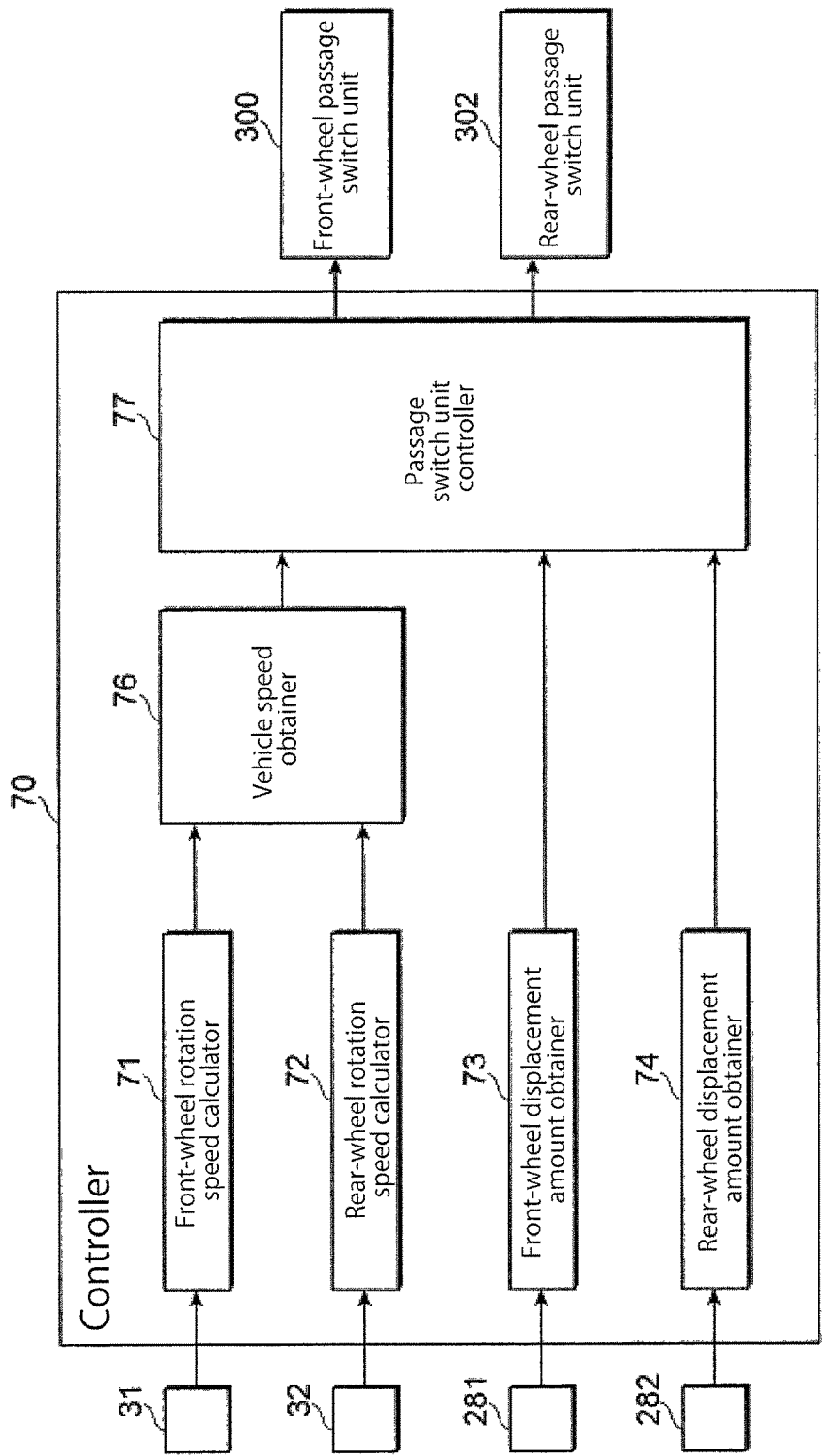
FIG. 12 is a block diagram of a controller.

FIG. 12 is a block diagram of the controller 70.

The controller 70 includes a CPU, a ROM, and a RAM. The ROM stores programs to be executed in the CPU and various kinds of data. The RAM is used as, for example, an operation memory for the CPU. The controller 70 receives inputs such as signals output from the front-wheel rotation detection sensor 31, the rear-wheel rotation detection sensor 32, the front-wheel relative position detector 281, and the rear-wheel relative position detector 282.

The controller 70 includes a front-wheel rotation speed calculator 71 and a rear-wheel rotation speed calculator 72. The front-wheel rotation speed calculator 71 calculates the rotation speed of the front wheel 2 based on an output signal from the front-wheel rotation detection sensor 31. The rear-wheel rotation speed calculator 72 calculates the rotation speed of the rear wheel 3 based on an output signal from the rear-wheel rotation detection sensor 32. The front-wheel rotation speed calculator 71 and the rear-wheel rotation speed calculator 72 each obtain a rotation angle based on a pulse signal, which is the output signal from the sensor, and differentiate the rotation angle by time elapsed so as to calculate the rotation speed.

The controller 70 includes a front-wheel displacement amount obtainer 73. The front-wheel displacement amount obtainer 73 obtains a front-wheel displacement amount Lf based on the output signal from the front-wheel relative position detector 281. The front-wheel displacement amount Lf is the amount of displacement of the upper-side end support member 270 of the front-wheel spring length adjustment unit 250 relative to the base member 260. The controller 70 also includes a rear-wheel displacement amount obtainer 74. The rear-wheel displacement amount obtainer 74 obtains a rear-wheel displacement amount Lr based on the output signal from the rear-wheel relative position detector 282. The rear-wheel displacement amount Lr is the amount of displacement of the upper-side end support member 254 of the rear-wheel spring length adjustment unit 252 relative to the base member 253. The front-wheel displacement amount obtainer 73 obtains the front-wheel displacement amount Lf based on a correlation between the impedance of the coil and the front-wheel displacement amount Lf. The rear-wheel displacement amount obtainer 74 obtains the rear-wheel displacement amount Lr based on a correlation between the impedance of the coil and the rear-wheel displacement amount Lr. The correlations are stored in the ROM in advance.

The controller 70 also includes a vehicle speed obtainer 76 to obtain a vehicle speed Vv, which is a traveling speed of the motorcycle 1, based on the rotation speed of the front wheel 2 calculated by the front-wheel rotation speed calculator 71 and/or based on the rotation speed of the rear wheel 3 calculated by the rear-wheel rotation speed calculator 72. The vehicle speed obtainer 76 uses the front-wheel rotation speed Rf or the rear-wheel rotation speed Rr to calculate the traveling speed of the front wheel 2 or the rear wheel 3 so as to obtain the vehicle speed Vv. The traveling speed of the front wheel 2 is calculated using the front-wheel rotation speed Rf and the outer diameter of the tire of the front wheel 2. The moving speed of the rear wheel 3 is calculated using the rear-wheel rotation speed Rr and the outer diameter of the tire of the rear wheel 3. When the motorcycle 1 is traveling in a normal state, it can be construed that the vehicle speed Vv is equal to the traveling speed of the front wheel 2 and/or the traveling speed of the rear wheel 3. Alternatively, the vehicle speed obtainer 76 may use an average value of the front-wheel rotation speed Rf and the rear-wheel rotation speed Rr to calculate an average traveling speed of the front wheel 2 and the rear wheel 3 so as to obtain the vehicle speed Vv.

The controller 70 also includes a passage switch unit controller 77 to control the switch states of the front-wheel passage switch unit 300 and the switch states of the rear-wheel passage switch unit 302 based on the vehicle speed Vv obtained by the vehicle speed obtainer 76. The passage switch unit controller 77 will be detailed later.

The front-wheel rotation speed calculator 71, the rear-wheel rotation speed calculator 72, the front-wheel displacement amount obtainer 73, the rear-wheel displacement amount obtainer 74, the vehicle speed obtainer 76, and the passage switch unit controller 77 are implemented by the CPU executing software stored in storage areas of, for example, the ROM.

The passage switch unit controller 77 of the controller 70 will now be described in detail.

Figure 13:
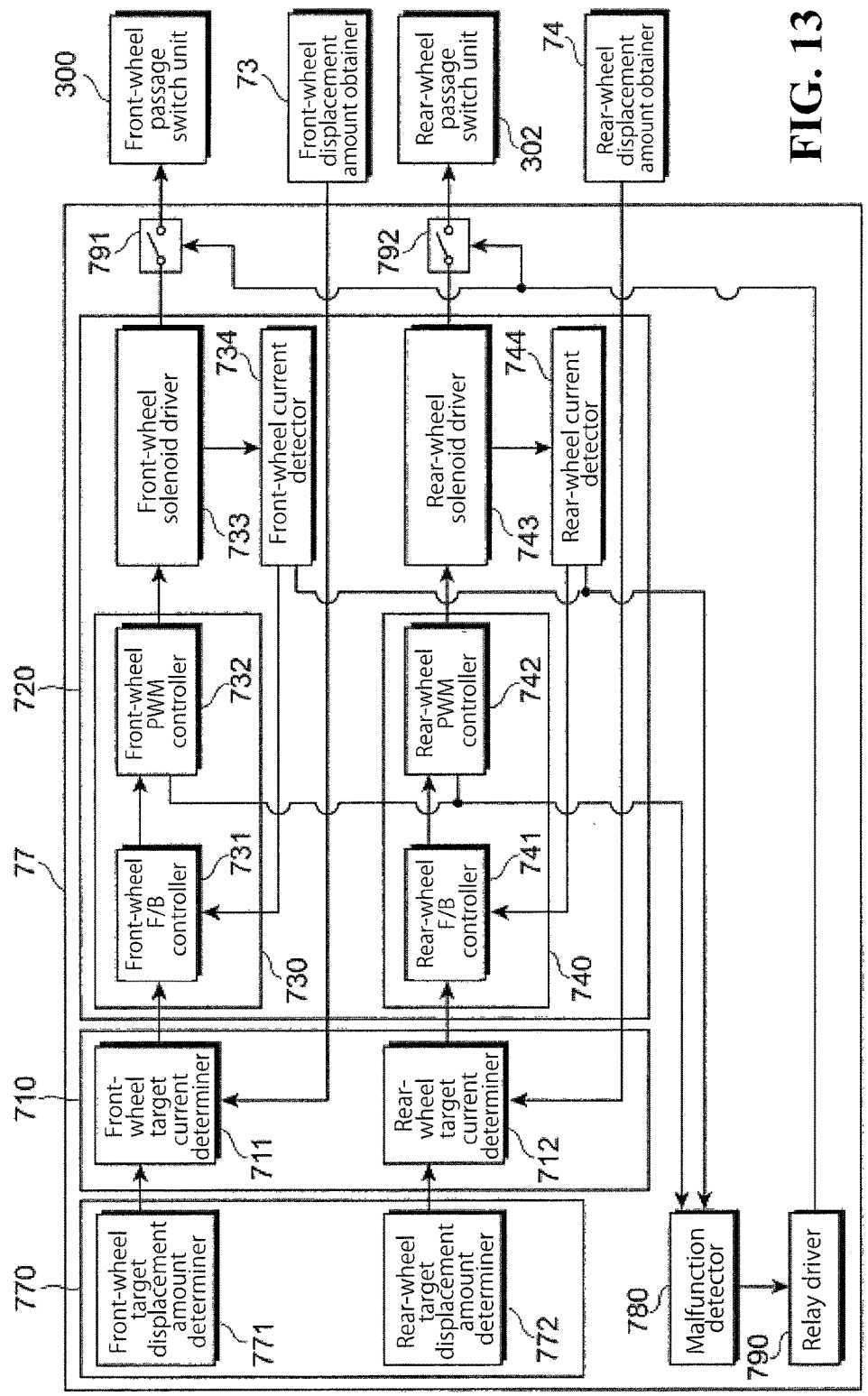
FIG. 13 is a block diagram of a passage switch unit controller.

FIG. 13 is a block diagram of the passage switch unit controller 77.

The passage switch unit controller 77 includes a target displacement amount determiner 770. The target displacement amount determiner 770 includes a front-wheel target displacement amount determiner 771 and a rear-wheel target displacement amount determiner 772. The front-wheel target displacement amount determiner 771 determines a front-wheel target displacement amount, which is a target value of the front-wheel displacement amount Lf. The rear-wheel target displacement amount determiner 772 determines a rear-wheel target displacement amount, which is a target value of the rear-wheel displacement amount Lr. The passage switch unit controller 77 also includes a target current determiner 710 and a control section 720. The target current determiner 710 determines a target current to be supplied to the front-wheel solenoid 310 of the front-wheel passage switch unit 300 and the rear-wheel solenoid (not illustrated) of the rear-wheel passage switch unit 302. The control section 720 performs control such as feedback control based on the target current determined by the target current determiner 710. The passage switch unit controller 77 further includes a malfunction detector 780. The malfunction detector 780 is an example of the malfunction detector to detect the failure to make the target current flow to the front-wheel solenoid 310 and the rear-wheel solenoid.

The passage switch unit controller 77 includes a front-wheel relay 791 and a rear-wheel relay 792. The front-wheel relay 791 is connected to a current path between a front-wheel solenoid driver 733, described later, and the front-wheel solenoid 310 so as to pass and shut off a current supplied from the front-wheel solenoid driver 733 to the front-wheel solenoid 310. The rear-wheel relay 792 is connected to a current path between a rear-wheel solenoid driver 743 and the rear-wheel solenoid so as to pass and shut off a current supplied from the rear-wheel solenoid driver 743 to the rear-wheel solenoid. The passage switch unit controller 77 also includes a relay driver 790 to control the front-wheel relay 791 and the rear-wheel relay 792 to operate.

The target displacement amount determiner 770 determines a target displacement amount based on the vehicle speed Vv obtained by the vehicle speed obtainer 76 and based on which control position a vehicle height adjustment switch (not illustrated) of the motorcycle 1 occupies. The vehicle height adjustment switch is what is called a dial switch. The rider of the motorcycle 1 turns the dial of the switch to select between "Low", "Medium", and "High". The vehicle height adjustment switch is disposed in the vicinity of the speedometer, for example.

After the motorcycle 1 starts traveling, when the vehicle speed Vv obtained by the vehicle speed obtainer 76 is lower than a predetermined upward vehicle speed Vu, the target displacement amount determiner 770 determines the target displacement amount as zero. When the vehicle speed Vv changes from the value lower than the upward vehicle speed Vu to a value equal to or higher than the upward vehicle speed Vu, the target displacement amount determiner 770 determines the target displacement amount at a predetermined value in accordance with the control position of the vehicle height adjustment switch. More specifically, when the vehicle speed Vv changes from the value lower than the upward vehicle speed Vu to a value equal to or higher than the upward vehicle speed Vu, the front-wheel target displacement amount determiner 771 determines the front-wheel target displacement amount as a predetermined front-wheel target displacement amount Lf0 in accordance with the control position of the vehicle height adjustment switch. When the vehicle speed Vv changes from the value lower than the upward vehicle speed Vu to a value equal to or higher than the upward vehicle speed Vu, the rear-wheel target displacement amount determiner 772 determines the rear-wheel target displacement amount as a predetermined rear-wheel target displacement amount Lr0 in accordance with the control position of the vehicle height adjustment switch. Then, while the vehicle speed Vv obtained by the vehicle speed obtainer 76 is equal to or higher than the upward vehicle speed Vu, the front-wheel target displacement amount determiner 771 determines the front-wheel target displacement amount as the predetermined front-wheel target displacement amount Lf0, and the rear-wheel target displacement amount determiner 772 determines the rear-wheel target displacement amount as the predetermined rear-wheel target displacement amount Lr0. The ROM stores, in advance, relationships of the control positions of the vehicle height adjustment switch, the predetermined front-wheel target displacement amount Lf0 that accords with the control position, and the predetermined rear-wheel target displacement amount Lr0 that accords with the control position. The vehicle height of the motorcycle 1 is determined in accordance with the front-wheel displacement amount Lf and the rear-wheel displacement amount Lr. In a non-limiting embodiment, a target vehicle height, which is a target value of the vehicle height of the motorcycle 1, is determined in accordance with the control position of the vehicle height adjustment switch. The predetermined front-wheel target displacement amount Lf0 and the predetermined rear-wheel target displacement amount Lr0 in accordance with the target vehicle height are determined in advance and stored in the ROM.

When the vehicle speed Vv of the motorcycle 1 changes from a value equal to or higher than the upward vehicle speed Vu to a value equal to or lower than a predetermined downward vehicle speed Vd, the target displacement amount determiner 770 determines the target displacement amount as zero. That is, the front-wheel target displacement amount determiner 771 and the rear-wheel target displacement amount determiner 772 respectively determine the front-wheel target displacement amount and the rear-wheel target displacement amount as zero. In a non-limiting example, the upward vehicle speed Vu is 7 km/h, and the downward vehicle speed Vd is 5 km/h.

The target current determiner 710 includes a front-wheel target current determiner 711 and a rear-wheel target current determiner 712. Based on the front-wheel target displacement amount determined by the front-wheel target displacement amount determiner 771, the front-wheel target current determiner 711 determines a front-wheel target current, which is a target current of the front-wheel solenoid 310 of the front-wheel passage switch unit 300. Based on the rear-wheel target displacement amount determined by the rear-wheel target displacement amount determiner 772, the rear-wheel target current determiner 712 determines a rear-wheel target current, which is a target current of the rear-wheel solenoid of the rear-wheel passage switch unit 302.

In a non-limiting embodiment, a map indicating correspondence between the front-wheel target displacement amount and the front-wheel target current is prepared based on empirical rules and stored in the ROM in advance. The front-wheel target current determiner 711 substitutes the front-wheel target displacement amount determined by the front-wheel target displacement amount determiner 771 into the map to determine the front-wheel target current.

In a non-limiting embodiment, a map indicating correspondence between the rear-wheel target displacement amount and the rear-wheel target current is prepared based on empirical rules and stored in the ROM in advance. The rear-wheel target current determiner 712 substitutes the rear-wheel target displacement amount determined by the rear-wheel target displacement amount determiner 772 into the map to determine the rear-wheel target current.

In the determination of the front-wheel target current based on the front-wheel target displacement amount determined by the front-wheel target displacement amount determiner 771, the front-wheel target current determiner 711 may perform feedback control based on an error between the front-wheel target displacement amount determined by the front-wheel target displacement amount determiner 771 and the front-wheel displacement amount Lf obtained by the front-wheel displacement amount obtainer 73 so as to determine the front-wheel target current. Similarly, in the determination of the rear-wheel target current based on the rear-wheel target displacement amount determined by the rear-wheel target displacement amount determiner 772, the rear-wheel target current determiner 712 may perform feedback control based on an error between the rear-wheel target displacement amount determined by the rear-wheel target displacement amount determiner 772 and the rear-wheel displacement amount Lr obtained by the rear-wheel displacement amount obtainer 74 so as to determine the rear-wheel target current.

The control section 720 includes the front-wheel solenoid driver 733, a front-wheel operation controller 730, and a front-wheel current detector 734. The front-wheel solenoid driver 733 drives the front-wheel solenoid 310 of the front-wheel passage switch unit 300. The front-wheel operation controller 730 controls operation of the front-wheel solenoid driver 733. The front-wheel current detector 734 detects the current flowing to the front-wheel solenoid 310. The control section 720 also includes a rear-wheel solenoid driver 743, a rear-wheel operation controller 740, and a rear-wheel current detector 744. The rear-wheel solenoid driver 743 drives the rear-wheel solenoid. The rear-wheel operation controller 740 controls operation of the rear-wheel solenoid driver 743. The rear-wheel current detector 744 detects the current flowing to the rear-wheel solenoid. It is noted that the front-wheel solenoid driver 733 and the rear-wheel solenoid driver 743 are examples of the actuator drivers to drive the actuators.

The front-wheel operation controller 730 includes a front-wheel feedback (F/B) controller 731 and a front-wheel PWM controller 732. The front-wheel feedback controller 731 performs feedback control based on an error between the front-wheel target current determined by the front-wheel target current determiner 711 and a current detected by the front-wheel current detector 734 (front-wheel detection current). The front-wheel PWM controller 732 performs PWM control of the front-wheel solenoid 310.

The rear-wheel operation controller 740 includes a rear-wheel feedback (F/B) controller 741 and a rear-wheel PWM controller 742. The rear-wheel feedback controller 741 performs feedback control based on an error between the rear-wheel target current determined by the rear-wheel target current determiner 712 and a current detected by the rear-wheel current detector 744 (rear-wheel detection current). The rear-wheel PWM controller 742 performs PWM control of the rear-wheel solenoid.

The front-wheel feedback controller 731 calculates an error between the front-wheel target current and the front-wheel detection current detected by the front-wheel current detector 734, and performs feedback processing to make the error zero. The rear-wheel feedback controller 741 calculates an error between the rear-wheel target current and the rear-wheel detection current detected by the rear-wheel current detector 744, and performs feedback processing to make the error zero. In a non-limiting embodiment, the front-wheel feedback controller 731 subjects the error between the front-wheel target current and the front-wheel detection current to proportional processing using a proportional element and to integral processing using an integral element, and adds these values together using an adder. The rear-wheel feedback controller 741 subjects the error between the rear-wheel target current and the rear-wheel detection current to proportional processing using a proportional element and to integral processing using an integral element, and adds these values together using an adder. In another non-limiting embodiment, the front-wheel feedback controller 731 subjects the error between the target current and the detection current to proportional processing using a proportional element, to integral processing using an integral element, and to differential processing using a differential element, and adds these values together using an adder. The rear-wheel feedback controller 741 subjects the error between the target current and the detection current to proportional processing using a proportional element, to integral processing using an integral element, and to differential processing using a differential element, and adds these values together using an adder.

The front-wheel PWM controller 732 changes a duty ratio ($=t/T\times100(\%)$) of a pulse width (t) in a predetermined cycle (T), and performs PWM control of an opening (voltage applied to the coil 311 of the front-wheel solenoid 310) of the front-wheel solenoid 310. When the PWM control is performed, the voltage is applied to the coil 311 of the front-wheel solenoid 310 in a form of a pulse that accords with the duty ratio. Here, due to the impedance of the coil 311, the current flowing to the coil 311 of the front-wheel solenoid 310 cannot change to follow the voltage applied in the form of the pulse but is output in a weakened form, and the current flowing in the coil 311 of the front-wheel solenoid 310 is increased and decreased in proportion to the duty ratio. In a non-limiting embodiment, when the front-wheel target current is zero, the front-wheel PWM controller 732 sets the duty ratio at zero. When the front-wheel target current is at its maximum, the front-wheel PWM controller 732 sets the duty ratio at 100%. In a non-limiting embodiment, when the duty ratio is set at 100%, a current of 3.2 A is controlled to flow to the coil 311 of the front-wheel solenoid 310. When the duty ratio is set at 50%, a current of 1.6 A is controlled to flow to the coil 311 of the front-wheel solenoid 310.

It is noted that the current that flows to the coil 311 of the front-wheel solenoid 310 varies depending on a voltage of a power source and a temperature. For example, when the duty ratio is the same, the current that flows to the coil 311 of the front-wheel solenoid 310 increases as the voltage of the power source is higher. Consequently, the front-wheel PWM controller 732 holds a reference value of the voltage of the power source, and when the voltage of the power source is higher than the reference value, for example, the front-wheel PWM controller 732 makes the duty ratio smaller than the duty ratio when the voltage of the power source is the reference value, to perform such control that a current exceeding the target current does not flow. When the duty ratio is the same, for example, the current that flows to the coil 311 of the front-wheel solenoid 310 decreases as the temperature is higher. Consequently, the front-wheel PWM controller 732 holds a reference value of the temperature, and when the temperature is higher than the reference value, the front-wheel PWM controller 732 makes the duty ratio larger than the duty ratio when the temperature is the reference value, to perform such control that a current closer to the target current flows. In a non-limiting example, the voltage of the power source is a battery voltage. The temperature is measured by a thermistor disposed in the controller 70 and is an example of the environment of the vehicle.

Similarly, the rear-wheel PWM controller 742 changes the duty ratio and performs PWM control of an opening (voltage applied to the coil of the rear-wheel solenoid) of the rear-wheel solenoid. When the PWM control is performed, the voltage is applied to the coil of the rear-wheel solenoid in a form of a pulse that accords with the duty ratio, and the current flowing in the coil of the rear-wheel solenoid is increased and decreased in proportion to the duty ratio. In a non-limiting embodiment, when the rear-wheel target current is zero, the rear-wheel PWM controller 742 sets the duty ratio at zero. When the rear-wheel target current is at its maximum, the rear-wheel PWM controller 742 sets the duty ratio at 100%. In a non-limiting embodiment, when the duty ratio is set at 100%, a current of 3.2 A is controlled to flow to the coil of the rear-wheel solenoid. When the duty ratio is set at 50%, a current of 1.6 A is controlled to flow to the coil of the rear-wheel solenoid.

The rear-wheel PWM controller 742 holds a reference value of the voltage of the power source, and when the voltage of the power source is higher than the reference value, for example, the rear-wheel PWM controller 742 makes the duty ratio smaller than the duty ratio when the voltage of the power source is the reference value, to perform such control that a current exceeding the target current does not flow. The rear-wheel PWM controller 742 holds a reference value of the temperature, and when the temperature is higher than the reference value, for example, the rear-wheel PWM controller 742 makes the duty ratio larger than the duty ratio when the temperature is the reference value, to perform such control that a current closer to the target current flows.

The front-wheel solenoid driver 733 includes, for example, a transistor (FET). The transistor is a switching element connected between a positive electrode line of the power source and the coil 311 of the front-wheel solenoid 310. In accordance with the duty ratio controlled by the front-wheel PWM controller 732, the front-wheel solenoid driver 733 drives a gate of the transistor to switch the transistor so as to control drive of the front-wheel solenoid 310. The rear-wheel solenoid driver 743 includes, for example, a transistor connected between the positive electrode line of the power source and the coil of the rear-wheel solenoid. The rear-wheel solenoid driver 743 drives a gate of the transistor to switch the transistor so as to control drive of the rear-wheel solenoid.

From voltage across the terminals of a shunt resistor connected to the front-wheel solenoid driver 733, the front-wheel current detector 734 detects a value of the current flowing to the front-wheel solenoid 310. From voltage across the terminals of a shunt resistor connected to the rear-wheel solenoid driver 743, the rear-wheel current detector 744 detects a value of the current flowing to the rear-wheel solenoid.

The malfunction detector 780 will be detailed later.

The relay driver 790 switches the front-wheel relay 791 and the rear-wheel relay 792 from OFF (an open state) to ON (a closed state) to pass the current, and switches the front-wheel relay 791 and the rear-wheel relay 792 from ON to OFF to shut off the current.

It is noted that the target current determiner 710, the control section 720, the target displacement amount determiner 770, the relay driver 790, the front-wheel relay 791, and the rear-wheel relay 792 are an example of the vehicle height controller to control the vehicle height.

In the motorcycle 1 of the above-described configuration, the passage switch unit controller 77 of the controller 70 determines the target current based on the target vehicle height in accordance with the control position of the vehicle height adjustment switch, and performs PWM control to cause an actual current supplied to the front-wheel solenoid 310 and the rear-wheel solenoid to be the target current determined. That is, the front-wheel PWM controller 732 and the rear-wheel PWM controller 742 of the passage switch unit controller 77 change the duty ratios to control power supplied to the coil 311 of the front-wheel solenoid 310 and the coil of the rear-wheel solenoid so as to control the front-wheel solenoid 310 and the rear-wheel solenoid into desired openings.

When a failure to make the target current flow to the front-wheel solenoid 310 and the rear-wheel solenoid occurs, the controller 70 of the above-described configuration cannot appropriately adjust the vehicle height.

For example, although the target current is a maintenance current that maintains the vehicle height (current equal to or higher than zero and less than the first reference current), a decreasing current that decreases the vehicle height (current equal to or higher than the second reference current) may flow to the front-wheel solenoid 310 and the rear-wheel solenoid. When such a failure occurs, the vehicle height unexpectedly decreases during travel.

Figure 14:
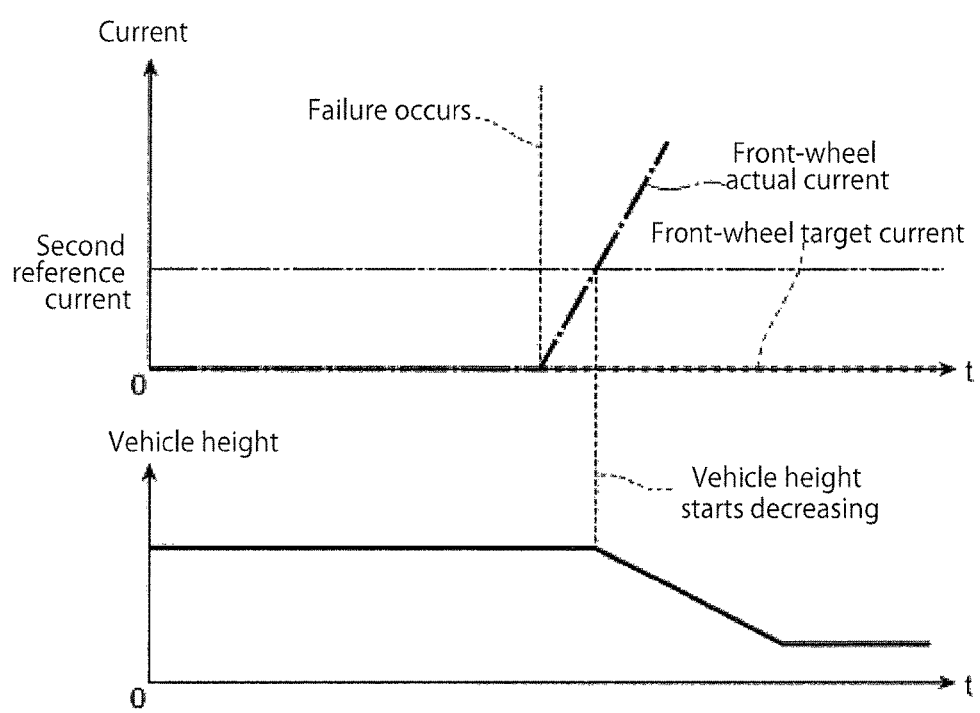
FIG. 14 is a time chart illustrating malfunction when a failure to make a target current flow to a front-wheel solenoid and a rear-wheel solenoid occurs.

FIG. 14 is a time chart illustrating malfunction when a failure to make the target current flow to the front-wheel solenoid 310 and the rear-wheel solenoid occurs. Although the front-wheel side is taken as an example in FIG. 14, the same applies to the rear-wheel side.

The target current is set at the maintenance current to maintain the vehicle height after increasing the vehicle height, and the current supplied to the front-wheel solenoid 310 is controlled to be the target current. In this case, a current that actually flows to the front-wheel solenoid 310 (actual current) may increase, and the target current may not flow. The example illustrated in FIG. 14 describes occurrence of such a failure. Although the target current is controlled to be the maintenance current, the actual current that flows to the front-wheel solenoid 310 may increase to be equal to or higher than the second reference current. In this case, even if the vehicle speed Vv of the motorcycle 1 is equal to or higher than the upward vehicle speed Vu, the front-wheel displacement amount Lf decreases, and the vehicle height decreases. When the vehicle height unexpectedly decreases during travel at a speed equal to or higher than the upward vehicle speed Vu, it becomes difficult to incline the body of the motorcycle 1, for example, which makes it difficult to secure a sufficiently large bank angle.

The target current is set at the increasing current to increase the vehicle height (current equal to or higher than the first reference current and less than the second reference current), and the current supplied to the front-wheel solenoid 310 is controlled to be the target current. In this case, the actual current that flows to the front-wheel solenoid 310 may increase, and the target current may not flow. Such a failure is also considered to occur. Although the target current is controlled to be the increasing current, the actual current that flows to the front-wheel solenoid 310 may increase to be equal to or higher than the second reference current. In this case, even if the vehicle speed Vv of the motorcycle 1 is equal to or higher than the upward vehicle speed Vu, the front-wheel displacement amount Lf decreases, and the vehicle height decreases. In this case, in the middle of the increase in the vehicle height of the motorcycle 1, the vehicle height decreases. When the vehicle height unexpectedly decreases during travel at a speed equal to or higher than the upward vehicle speed Vu, it becomes difficult to incline the body of the motorcycle 1, for example, which makes it difficult to secure a sufficiently large bank angle.

The failure to make the target current flow to the front-wheel solenoid 310 and the rear-wheel solenoid is, for example, a case in which the actual current is 0.1 A or more respectively deviated from the front-wheel target current and the rear-wheel target current.

As the failure to make the target current flow to the front-wheel solenoid 310 and the rear-wheel solenoid in this manner, malfunction of the transistor (FET) of the front-wheel solenoid driver 733 and the rear-wheel solenoid driver 743 and malfunction of the coils of the front-wheel solenoid 310 and the rear-wheel solenoid, for example, are considered.

It is noted that the failure to make the target current flow to the front-wheel solenoid 310 and the rear-wheel solenoid is not limited to the above-described case in which the actual current increases. A case in which the actual current decreases is also considered. For example, although the target current is controlled to be the decreasing current, the actual current that flows to the front-wheel solenoid 310 may decrease to be equal to or higher than the first reference current and less than the second reference current. In this case, even if the vehicle speed Vv of the motorcycle 1 is equal to or lower than the downward vehicle speed Vd, the vehicle height increases. Then, at a time of a halt of the motorcycle 1, the vehicle height is also kept high. This makes it difficult for the rider to get on and off the motorcycle 1.

Details of Malfunction Detector 780

In view of the above-described circumstances, the malfunction detector 780 according to this embodiment detects the failure to make the target current flow to the front-wheel solenoid 310 and the rear-wheel solenoid. More specifically, the malfunction detector 780 detects the failure to make the target current flow to the front-wheel solenoid 310 and the rear-wheel solenoid based on the actual currents that flow to the front-wheel solenoid 310 and the rear-wheel solenoid and a standard current, which is estimated from the duty ratios of the voltages applied to the front-wheel solenoid 310 and the rear-wheel solenoid. When the malfunction detector 780 detects the failure, the malfunction detector 780 controls the front-wheel passage switch unit 300 and the rear-wheel passage switch unit 302 so as to maintain the vehicle height.

The front-wheel side will be taken as an example and described in detail below. Since the same applies to the rear-wheel side, the rear-wheel side will not be elaborated here.

First, the malfunction detector 780 estimates the standard current based on the duty ratio controlled by the front-wheel PWM controller 732. Then, the malfunction detector 780 calculates an allowable range set based on the standard current.

Figure 15:
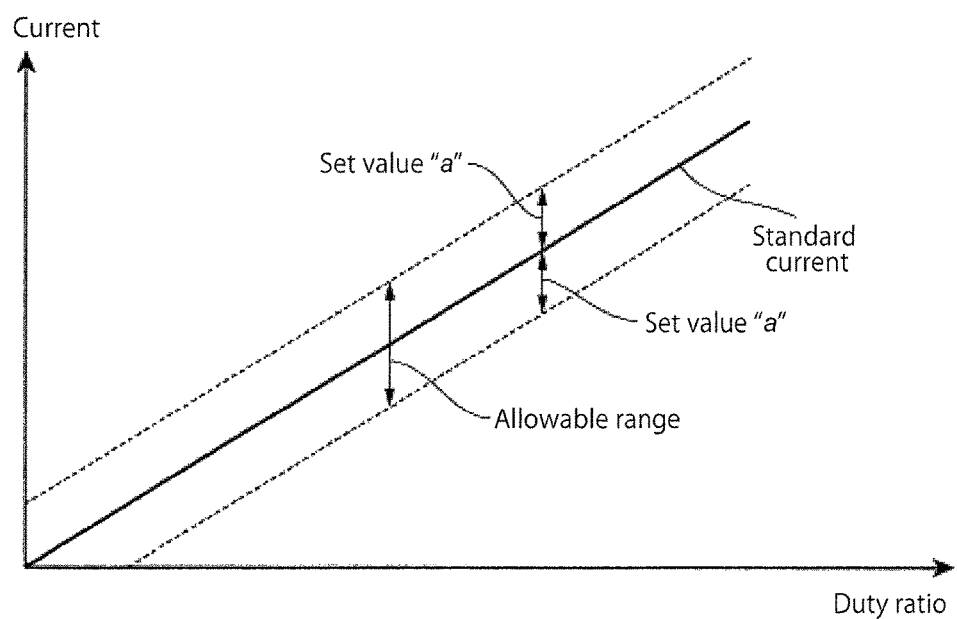
FIG. 15 illustrates an exemplary allowable range set based on a standard current.

FIG. 15 illustrates an example of the allowable range set based on the standard current. As in the illustrated example, correlation between the duty ratio and the allowable range set based on the standard current is stored in the ROM in advance. In the example illustrated in FIG. 15, a set value "a" (which is a positive value) is determined, and the allowable range set based on the standard current is a range equal to or higher than (standard current−set value "a") and equal to or less than (standard current+set value "a").

In this case, when a period of time in which the actual current that flows to the front-wheel solenoid 310 is out of the range equal to or higher than (standard current−set value "a") and equal to or less than (standard current+set value "a") continues for a first predetermined period of time t1 or longer, the malfunction detector 780 determines that the failure to make the target current flow to the front-wheel solenoid 310 has occurred. In other words, when a state in which a difference between the actual current that flows to the front-wheel solenoid 310 and the standard current estimated from the duty ratio exceeds the set value "a" continues for the first predetermined period of time t1 or longer, the malfunction detector 780 determines that the failure to make the target current flow to the front-wheel solenoid 310 has occurred. It is noted that as the actual current that flows to the front-wheel solenoid 310, a current value (detection value) detected by the front-wheel current detector 734 is used.

When determining that the failure to make the target current flow to the front-wheel solenoid 310 has occurred, the malfunction detector 780 lights a warning lamp and outputs to the relay driver 790 a command signal to turn off the front-wheel relay 791 so as to maintain the vehicle height. When obtaining the command signal to turn off the front-wheel relay 791 from the malfunction detector 780, the relay driver 790 turns off the front-wheel relay 791. As a result, no current is supplied to the front-wheel solenoid 310, and the front-wheel displacement amount Lf is maintained to maintain the vehicle height.

It is noted that the malfunction detector 780 also corrects the standard current estimated from the duty ratio based on the voltage of the power source and the temperature. More specifically, as the voltage of the power source is higher than the reference value, the malfunction detector 780 performs such correction that the standard current estimated from the duty ratio is higher. As the temperature is higher than the reference value, the malfunction detector 780 performs such correction that the standard current estimated from the duty ratio is lower.

Figure 16:
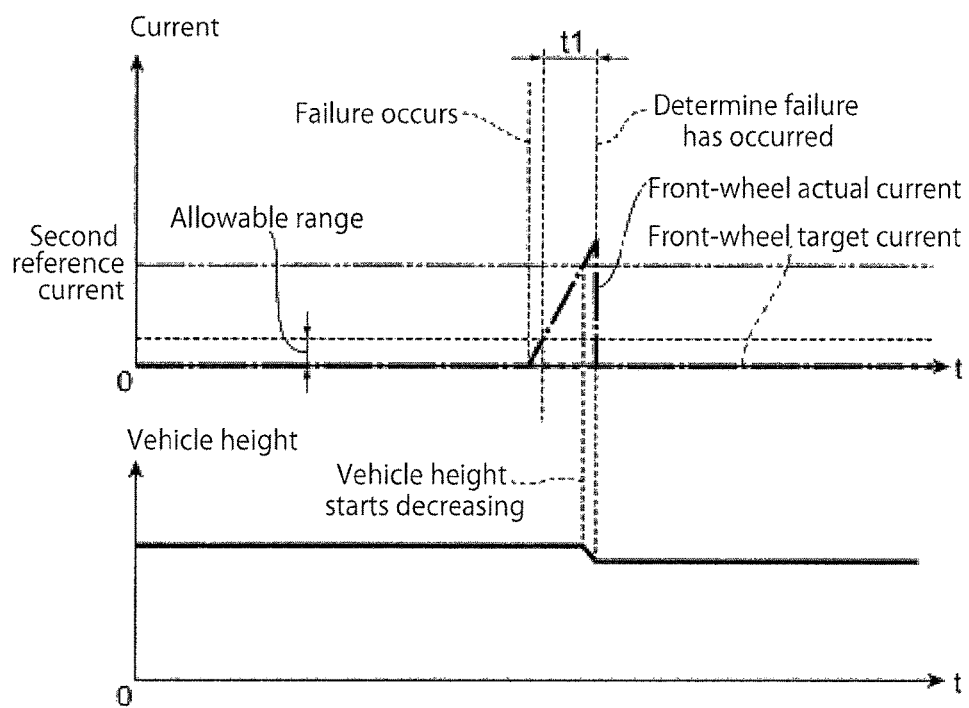
FIG. 16 is a time chart illustrating control details of a malfunction detector according to the embodiment.

FIG. 16 is a time chart illustrating control details of the malfunction detector 780 according to this embodiment. The example illustrated in FIG. 16, which is similar to the example illustrated in FIG. 14, describes a case in which the failure occurs when the target current is set at the maintenance current to maintain the vehicle height after increasing the vehicle height, and when the current supplied to the front-wheel solenoid 310 is controlled to be the target current.

When a period of time in which the actual current to the front-wheel solenoid 310 is out of the range set based on the standard current continues for the first predetermined period of time t1 or longer, the malfunction detector 780 determines that the failure to make the target current flow to the front-wheel solenoid 310 has occurred. When the malfunction detector 780 determines that the failure has occurred, the malfunction detector 780 outputs to the relay driver 790 a command signal to turn off the front-wheel relay 791 so as to maintain the vehicle height. As a result, even if the vehicle height decreases due to occurrence of the failure, the failure is detected to stop supply of the current to the front-wheel solenoid 310. Thus, the vehicle height does not decrease to a lower limit of the vehicle height but is maintained.

Next, using a flowchart, a procedure for the control processing performed by the malfunction detector 780 will be described.

Figure 17:
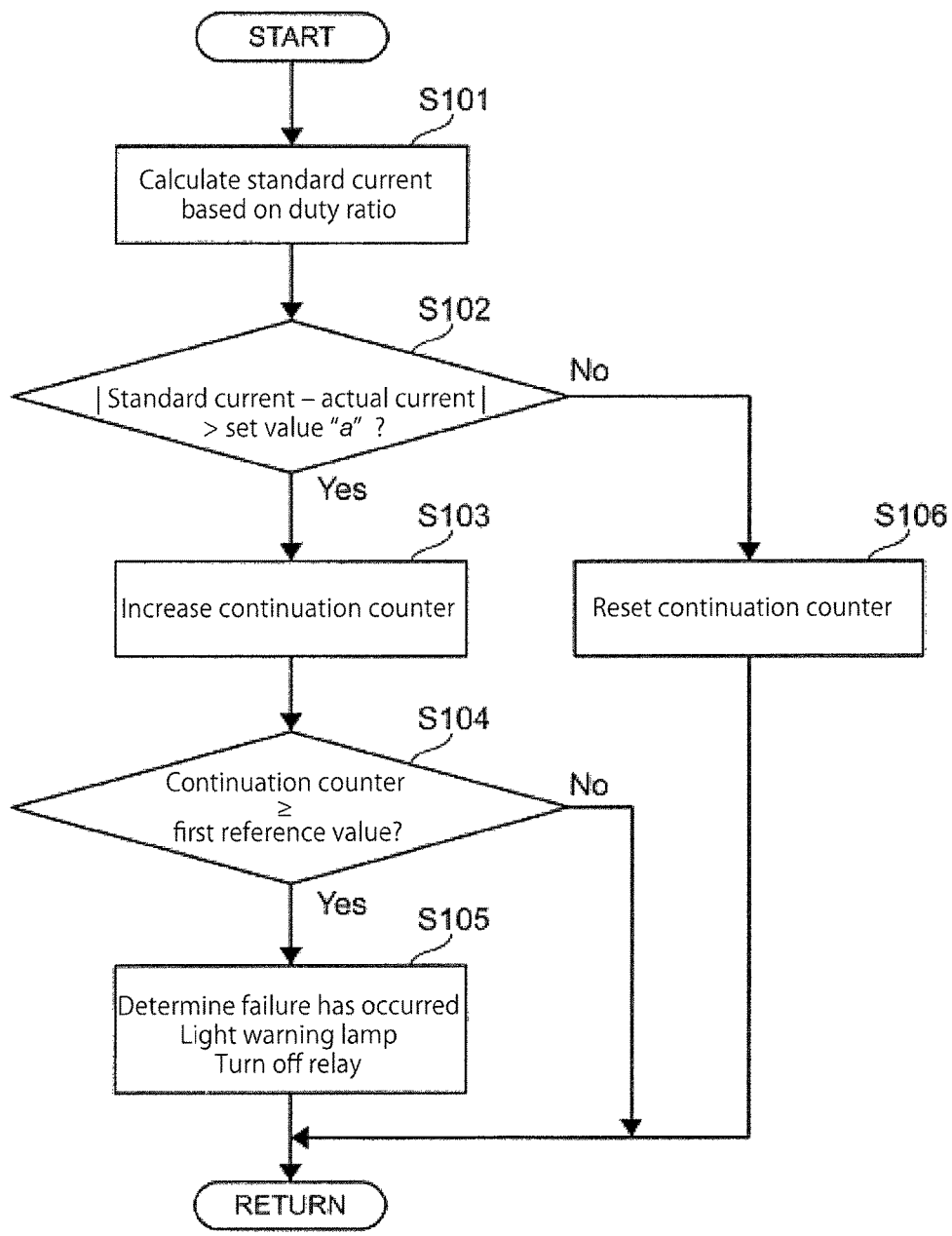
FIG. 17 is a flowchart of a procedure for control processing performed by the malfunction detector.

FIG. 17 is the flowchart of the procedure for the control processing performed by the malfunction detector 780.

As described above, the malfunction detector 780 detects the failure to make the target current flow to the front-wheel solenoid 310 and the rear-wheel solenoid. In the following description, however, the control processing for detecting the failure of the front-wheel side will be taken as a representative example. The control processing for detecting the failure of the rear-wheel side, which is approximately the same as the control processing for detecting the failure of the front-wheel side, will not be elaborated here.

In a non-limiting example, the malfunction detector 780 performs the control processing in every predetermined cycle (1 msec, for example) repeatedly.

First, the malfunction detector 780 calculates the standard current of the front-wheel solenoid 310 based on the duty ratio controlled by the front-wheel PWM controller 732 (S101). Here, the malfunction detector 780 also corrects the standard current based on the voltage of the power source and the temperature measured by the thermistor disposed in the controller 70. It is noted that to correct the standard current, one or both of the voltage of the power source and the temperature may be used.

Next, the malfunction detector 780 makes a determination as to whether an absolute value of a difference between the standard current and the actual current that flows to the front-wheel solenoid 310 is larger than the set value "a" (S102). When the absolute value of the difference between the standard current and the actual current to the front-wheel solenoid 310 is larger than the set value "a" (Yes at S102), the malfunction detector 780 increases the continuation counter (S103). Next, the malfunction detector 780 makes a determination as to whether the continuation counter is equal to or larger than a first reference value, which is determined in advance as a value equivalent to the first predetermined period of time t1 (S104). This is the processing for making a determination as to whether the period of time in which the absolute value of the difference between the standard current and the actual current to the front-wheel solenoid 310 is larger than the set value "a" is equal to or longer than the predetermined period of time t1.

When the continuation counter is equal to or larger than the first reference value (Yes at S104), the malfunction detector 780 determines that the failure to make the target current flow to the front-wheel solenoid 310 has occurred. Then, the malfunction detector 780 lights the warning lamp and outputs to the relay driver 790 a command signal to turn off (OFF) the front-wheel relay 791 (S105). The malfunction detector 780 resets the continuation counter and ends performance of this control processing. When at S104 the continuation counter is less than the first reference value (No at S104), the malfunction detector 780 ends performance of this control processing.

When at S102 the malfunction detector 780 determines that the absolute value of the difference between the standard current and the actual current to the front-wheel solenoid 310 is equal to or smaller than the set value "a" (No at S102), the malfunction detector 780 resets the continuation counter (S106) and ends performance of this control processing.

It is noted that the first predetermined period of time t1 may be changed in accordance with the vehicle speed Vv. For example, when the vehicle speed Vv is equal to or higher than 40 km/h, the first predetermined period of time t1 may be set at 80 msec. As in this example, the first predetermined period of time t1 may be made shorter as the vehicle speed Vv is higher. The reason is that as the vehicle speed Vv is higher, it becomes more difficult to incline the body of the motorcycle 1 when the vehicle height unexpectedly decreases during travel.

The malfunction detector 780 of the above-described configuration detects the failure to make the target current flow to the front-wheel solenoid 310 and the rear-wheel solenoid based on the actual currents that flow to the front-wheel solenoid 310 and the rear-wheel solenoid and the standard current estimated from the duty ratio. When the failure is detected, the malfunction detector 780 turns off the front-wheel relay 791 and the rear-wheel relay 792. Then, since no current is supplied to the front-wheel solenoid 310 and the rear-wheel solenoid, the front-wheel displacement amount Lf and the rear-wheel displacement amount Lr are maintained to maintain the vehicle height. This prevents the actual current from increasing and becoming out of the allowable range set based on the standard current, and eliminates or minimizes a decrease in the vehicle height. This prevents a sudden decrease in the vehicle height in spite of high-speed travel, for example, to eliminate or minimize the rider's difficulty in inclining the body of the motorcycle 1 due to the sudden decrease in the vehicle height during travel.

When the vehicle speed Vv of the motorcycle 1 is equal to or lower than the downward vehicle speed Vd, turning off the front-wheel relay 791 and the rear-wheel relay 792 prevents the actual current from decreasing and becoming out of the allowable range set based on the standard current so as to eliminate or minimize an increase in the vehicle height. This prevents the vehicle height from increasing although the vehicle speed Vv of the motorcycle 1 is equal to or lower than the downward vehicle speed Vd. This prevents the vehicle height from being kept high even at a halt of the motorcycle 1.

Each of the front-wheel passage switch unit 300 and the rear-wheel passage switch unit 302 controls, as a single unit, three control modes in accordance with the amount of the current. The three control modes are: an increasing mode for increasing the vehicle height, a decreasing mode for decreasing the vehicle height, and a maintenance mode for maintaining the vehicle height. In the above-described embodiment, the control performed by the malfunction detector 780 is applied to the front-wheel passage switch unit 300 and the rear-wheel passage switch unit 302 to control the three control modes as a single unit. Application of the control performed by the malfunction detector 780, however, should not be limited to the unit to control the three control modes as a single unit. The control may be applied to a configuration in which the three control modes are implemented by two control valves (electromagnetic actuators).

In Japanese Examined Patent Publication No. 8-22680, it is considered that the vehicle height adjustment device includes a changer (such as an electromagnetic actuator) that is driven into operation when supplied with a current to adjust the height of the motorcycle, and that a target current, which is set based on a target height of the motorcycle, is supplied to the changer to control the height of the motorcycle. With this configuration, when a failure to make the target current flow to the changer occurs, it becomes difficult to adjust the height of the motorcycle. For example, when the failure occurs while the motorcycle is traveling at high speed, there is a possibility of a sudden decrease in the height of the motorcycle in spite of the high-speed travel. When the height of the motorcycle unexpectedly decreases during the travel, it becomes difficult for the rider of the motorcycle to incline the body and secure a sufficiently large bank angle. In view of this, it is important to detect the failure to make the target current flow to the changer.

In a non-limiting embodiment of the present disclosure, the vehicle height controller may include a current detector configured to detect a current that flows to the changer. The malfunction detector may be configured to detect the failure based on a detection value detected by the current detector and an estimation value of a current estimated from a duty ratio of a voltage applied to the changer by the vehicle height controller.

In a non-limiting embodiment of the present disclosure, the malfunction detector may be configured to determine that the failure has occurred when a state in which a difference between the detection value detected by the current detector and the estimation value of the current estimated from the duty ratio exceeds a set value continues for a predetermined period of time.

In a non-limiting embodiment, the estimation value of the current estimated from the duty ratio may be corrected based on at least one of an environment of the vehicle and a voltage of a power source.

In a non-limiting embodiment of the present disclosure, the changer may include an actuator drivable when supplied with a current and configured to change the relative position. The vehicle height controller may include an actuator, a relay, and a relay driver. The actuator driver may be configured to drive the actuator. The relay may be configured to electrically connect the actuator driver with the actuator and disconnect the actuator driver from the actuator. The relay driver may be configured to disconnect the relay when the malfunction detector detects the failure.

The embodiments eliminate or minimize an undesirably large increase in a difference between the actual vehicle height and the target vehicle height.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A vehicle height adjustment device comprising:
    an actuator drivable when supplied with a current and configured to change a relative position of a body of a vehicle relative to an axle of a wheel of the vehicle;
    a vehicle height controller configured to perform such control that a target current set based on the relative position is supplied to the actuator so as to control a vehicle height which is a height of the body of the vehicle; and
    a malfunction detector configured to detect a failure to make the target current flow to the actuator;
    wherein the vehicle height controller comprises a current detector configured to detect a current that flows to the actuator;
    wherein the malfunction detector is configured to detect the failure based on a detection value detected by the current detector and an estimation value of a current estimated from a duty ratio of a voltage applied to the actuator by the vehicle height controller; and wherein the estimation value of the current estimated from the duty ratio is corrected based on an environment of the vehicle and a voltage of a power source.

2. The vehicle height adjustment device according to claim 1,
wherein the malfunction detector is configured to determine that the failure has occurred when a state in which a difference between the detection value detected by the current detector and the estimation value of the current estimated from the duty ratio exceeds a set value continues for a predetermined period of time.

3. The vehicle height adjustment device according to claim 1,
wherein the actuator comprises an electromagnetic actuator that is drivable when supplied with a current and is configured to change the relative position, and
wherein the vehicle height controller comprises:
an actuator driver configured to drive the electromagnetic actuator;
a relay configured to electrically connect the actuator driver with the electromagnetic actuator and electrically disconnect the actuator driver from the electromagnetic actuator; and
a relay driver configured to make the relay disconnect the electromagnetic actuator and the actuator driver from each other when the malfunction detector detects the failure.

4. The vehicle height adjustment device according to claim 2,
wherein the actuator comprises an electromagnetic actuator that is drivable when supplied with a current and is configured to change the relative position, and
wherein the vehicle height controller comprises:
an actuator driver configured to drive the electromagnetic actuator;
a relay configured to electrically connect the actuator driver with the electromagnetic actuator and electrically disconnect the actuator driver from the electromagnetic actuator; and
a relay driver configured to make the relay disconnect the electromagnetic actuator and the actuator driver from each other when the malfunction detector detects the failure.

* * * * *